US012476188B2

(12) United States Patent
Joe et al.

(10) Patent No.: US 12,476,188 B2
(45) Date of Patent: Nov. 18, 2025

(54) MEMORY DEVICE INCLUDING ASYMMETRIC GROUND SELECTION LINES

(71) Applicant: Samsung Electronics Co., Ltd., Suwon-si (KR)

(72) Inventors: Sung-Min Joe, Seoul (KR); Sang Soo Park, Hwaseong-si (KR); Chung-Ho Yu, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 114 days.

(21) Appl. No.: 17/979,179

(22) Filed: Nov. 2, 2022

(65) Prior Publication Data

US 2023/0170299 A1 Jun. 1, 2023

(30) Foreign Application Priority Data

Nov. 16, 2021 (KR) ........................ 10-2021-0157853
Jan. 26, 2022 (KR) ........................ 10-2022-0011618

(51) Int. Cl.

| | |
|---|---|
| ***G11C 7/18*** | (2006.01) |
| ***G11C 8/14*** | (2006.01) |
| ***G11C 16/04*** | (2006.01) |
| ***G11C 16/26*** | (2006.01) |
| ***H01L 23/528*** | (2006.01) |
| ***H10B 43/27*** | (2023.01) |
| *G11C 7/12* | (2006.01) |
| *G11C 8/08* | (2006.01) |
| *G11C 16/08* | (2006.01) |

(Continued)

(52) U.S. Cl.
CPC ........ *H01L 23/528* (2013.01); *G11C 16/0483* (2013.01); *G11C 16/26* (2013.01); *H10B 43/27* (2023.02)

(58) Field of Classification Search
CPC ... H01L 23/528; G11C 16/0483; G11C 16/26; G11C 16/08; G11C 16/24; G11C 7/12; G11C 7/18; G11C 8/08; G11C 8/14; H10B 43/27; H10B 43/10; H10B 43/35
See application file for complete search history.

(56) References Cited

U.S. PATENT DOCUMENTS 8,748,969 B2 6/2014 Wenxu et al.
9,064,576 B2 6/2015 Tanzawa
(Continued)

FOREIGN PATENT DOCUMENTS

| | | |
|---|---|---|
| KR | 1020130072671 A | 7/2013 |
| KR | 1020190010403 A | 1/2019 |
| KR | 1020210044497 A | 4/2021 |

*Primary Examiner* — Son T Dinh
*Assistant Examiner* — Elizabeth Rose Agger
(74) *Attorney, Agent, or Firm* — Muir Patent Law, PLLC

(57) ABSTRACT

A memory device includes a substrate, a first cell string, second cell string, and third cell string, each connected to a first bit line and formed in a direction perpendicular to a top surface of the substrate, a first upper ground selection line connected to the first cell string, a second upper ground selection line separated from the first upper ground selection line and connected to the second and third cell strings, a first lower ground selection line connected to the first and second cell strings, and a second lower ground selection line separated from the first lower ground selection line and connected to the third cell string.

19 Claims, 28 Drawing Sheets

(51) Int. Cl.

| | |
|---|---|
| *G11C 16/24* | (2006.01) |
| *H10B 43/10* | (2023.01) |
| *H10B 43/35* | (2023.01) |

(56) References Cited

U.S. PATENT DOCUMENTS

| | | | | |
|---|---|---|---|---|
| 9,728,266 | B1 | 8/2017 | Goda et al. | |
| 9,899,401 | B2 | 2/2018 | Seol et al. | |
| 10,242,999 | B2 | 3/2019 | Yun et al. | |
| 10,679,700 | B2 | 6/2020 | Shibata et al. | |
| 11,018,150 | B2 | 5/2021 | Fujii et al. | |
| 2017/0186758 | A1* | 6/2017 | Lee | H10B 43/40 |
| 2019/0319033 | A1* | 10/2019 | Lee | H10B 43/35 |
| 2020/0303410 | A1 | 9/2020 | Kanamori et al. | |
| 2020/0343259 | A1 | 10/2020 | Kang et al. | |
| 2020/0381449 | A1* | 12/2020 | Moon | H10B 43/27 |
| 2020/0395076 | A1 | 12/2020 | Kim et al. | |
| 2021/0111187 | A1 | 4/2021 | Ahn et al. | |

* cited by examiner

FIG. 17

<table>
<tr><th></th><th>CSa (Sel)</th><th>CSb</th><th>CSc</th><th>CSd</th></tr>
<tr><td>GSLu</td><td>Vread</td><td colspan="3">V1</td></tr>
<tr><td>GSLm</td><td colspan="2">Vread</td><td colspan="2">V1</td></tr>
<tr><td>GSLd</td><td colspan="3">Vread</td><td>V1</td></tr>
</table>

<table>
<tr><th></th><th>CSa</th><th>CSb (Sel)</th><th>CSc</th><th>CSd</th></tr>
<tr><td>GSLu</td><td>V1</td><td colspan="3">Vread</td></tr>
<tr><td>GSLm</td><td colspan="2">Vread</td><td colspan="2">V1 → V2</td></tr>
<tr><td>GSLd</td><td colspan="3">Vread</td><td>V1</td></tr>
</table>

<table>
<tr><th></th><th>CSa</th><th>CSb</th><th>CSc (Sel)</th><th>CSd</th></tr>
<tr><td>GSLu</td><td>V1</td><td colspan="3">Vread</td></tr>
<tr><td>GSLm</td><td colspan="2">V1 → V2</td><td colspan="2">Vread</td></tr>
<tr><td>GSLd</td><td colspan="3">Vread</td><td>V1 → V2</td></tr>
</table>

<table>
<tr><th></th><th>CSa</th><th>CSb</th><th>CSc</th><th>CSd (Sel)</th></tr>
<tr><td>GSLu</td><td>V1</td><td colspan="3">Vread</td></tr>
<tr><td>GSLm</td><td colspan="2">V1 → V2</td><td colspan="2">Vread</td></tr>
<tr><td>GSLd</td><td colspan="3">V1 → V2</td><td>Vread</td></tr>
</table>

MEMORY DEVICE INCLUDING ASYMMETRIC GROUND SELECTION LINES

CROSS-REFERENCE TO RELATED APPLICATIONS

This application claims priority under 35 U.S.C. § 119 to Korean Patent Application Nos. 10-2021-0157853 filed on Nov. 16, 2021, and 10-2022-0011618 filed on Jan. 26, 2022, in the Korean Intellectual Property Office, the disclosures of which are incorporated by reference herein in their entireties.

BACKGROUND

Embodiments of the present disclosure described herein relate to a semiconductor memory, and more particularly, relate to a memory device including asymmetric ground selection lines.

A semiconductor memory device is classified as a volatile memory device, in which stored data disappear when a power supply is turned off, such as a static random access memory (SRAM) or a dynamic random access memory (DRAM), or a nonvolatile memory device, in which stored data are retained even when a power supply is turned off, such as a flash memory device, a phase-change RAM (PRAM), a magnetic RAM (MRAM), a resistive RAM (RRAM), or a ferroelectric RAM (FRAM).

The flash memory device is being widely used as a high-capacity storage medium. In general, flash memory devices store or read data by controlling levels of various lines (e.g., a string selection line, a word line, and a ground selection line) connected with a plurality of memory cells. In the case where various lines are controlled in units of cell string, the reliability and performance of the flash memory device may be improved. However, as the process of manufacturing the flash memory device becomes complicated, it is difficult to form the lines independently of each other.

SUMMARY

Embodiments of the present disclosure provide a memory device including asymmetric ground selection lines capable of reducing costs, improving performance, and reducing power consumption.

According to an embodiment, a memory device includes a substrate, a first cell string, second cell string, and third cell string, each connected to a first bit line and formed in a direction perpendicular to a top surface of the substrate; a first upper ground selection line connected to the first cell string; a second upper ground selection line separated from the first upper ground selection line and connected to the second and third cell strings; a first lower ground selection line connected to the first and second cell strings; and a second lower ground selection line separated from the first lower ground selection line and connected to the third cell string.

According to an embodiment, a memory device includes a substrate, a first lower ground selection line and a second lower ground selection line placed at a first height above a top surface of the substrate, a first ground selection line separation structure formed at the first height between the first and second lower ground selection lines, a first upper ground selection line and a second upper ground selection line placed at a second height above a top surface of the substrate and stacked on the first and second lower ground selection lines in a direction perpendicular to the substrate, and a second ground selection line separation structure formed at the second height between the first and second upper ground selection lines. The first ground selection line separation structure and the second ground selection line separation structure do not overlap each other when viewed in a plan view from above a first plane parallel to the substrate.

According to an embodiment, a memory device includes a substrate, a first word line cut region formed in a direction perpendicular to the top surface of the substrate, a second word line cut region spaced from the first word line cut region in a first direction, a plurality of cell strings arranged between the first and second word line cut regions in the first direction and extending in the direction perpendicular to the top surface of the substrate, and a plurality of ground selection lines connected with the plurality of cell strings. A first ground selection line of the plurality of ground selection lines is connected to a first string of the plurality of cell strings. A second ground selection line of the plurality of ground selection lines and separate from the first ground selection line is connected to a second string and a third string of the plurality of cell strings. A third ground selection line of the plurality of ground selection lines is connected to the first string and the second string of the plurality of cell strings. A fourth ground selection line of the plurality of ground selection lines and separate from the third ground selection line is connected to the third part of the plurality of cell strings.

BRIEF DESCRIPTION OF THE FIGURES

The above and other objects and features of the present disclosure will become apparent by describing in detail embodiments thereof with reference to the accompanying drawings.

FIG. 17 is a diagram for describing operations of a memory device of FIG. 1.

DETAILED DESCRIPTION

Below, embodiments of the present disclosure are described in detail and clearly to such an extent that an ordinary one in the art easily implements the invention.

Figure 1:
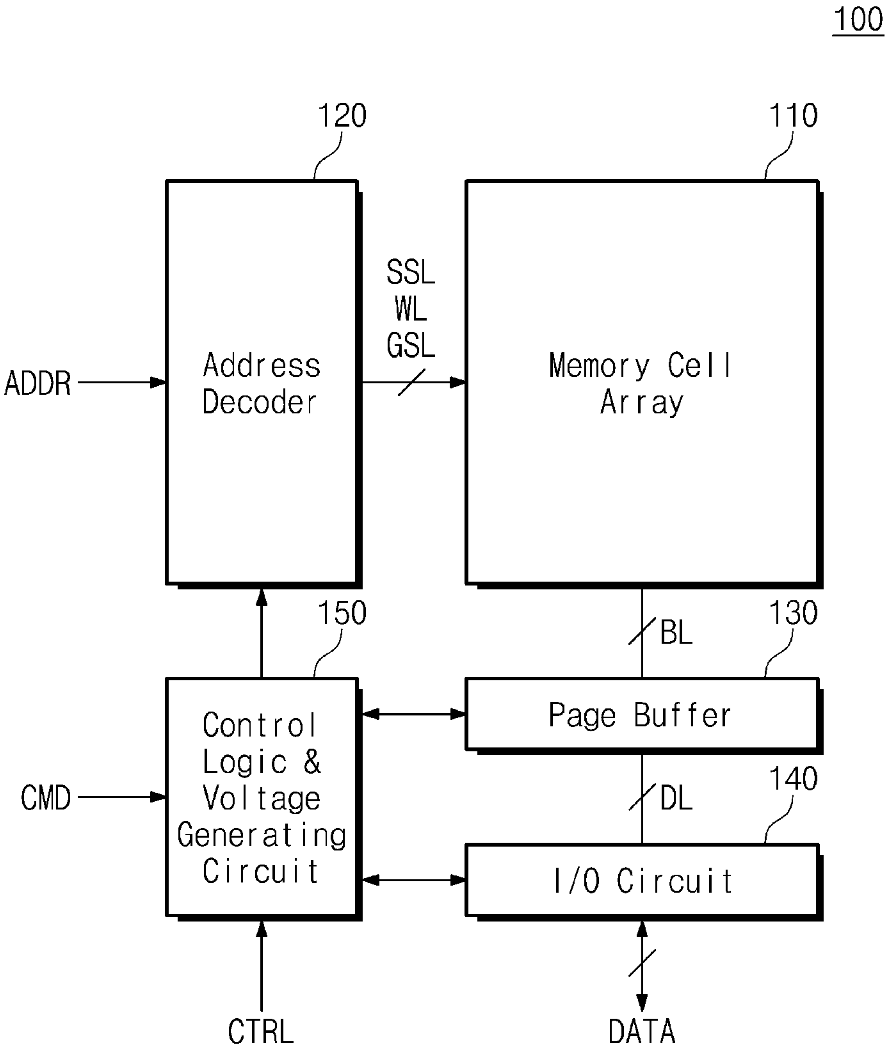
FIG. 1 is a block diagram illustrating a memory device according to an embodiment of the present disclosure.

FIG. 1 is a block diagram illustrating a memory device according to an embodiment of the present disclosure. Referring to FIG. 1, a memory device 100 may include a memory cell array 110, an address decoder 120, a page buffer circuit 130, an input/output circuit 140, and a control logic and voltage generating circuit 150. In an embodiment, the memory device 100 may be a nonvolatile memory device that includes NAND flash memory cells.

The memory cell array 110 may include a plurality of memory blocks. Each of the plurality of memory blocks may include a plurality of cell strings, each of which includes a plurality of cell transistors. The plurality of cell transistors may be connected in series between bit lines BL and a common source line CSL and may be connected with string selection lines SSL, word lines WL, and ground selection lines GSL. In an embodiment, some of the plurality of cell transistors may be connected with erase control lines ECL and may be used for an erase operation of each of the plurality of memory blocks. A structure of each of the plurality of memory blocks will be described in detail with reference to the following drawings.

The address decoder 120 may be connected to the memory cell array 110 through the string selection lines SSL, the word lines WL, the ground selection lines GSL, and the erase control lines ECL. The address decoder 120 may receive an address ADDR from an external device (e.g., a memory controller) and may decode the received address ADDR. The address decoder 120 may control the string selection lines SSL, the word lines WL, the ground selection lines GSL, and the erase control lines ECL based on a decoding result.

The page buffer circuit 130 may be connected to the memory cell array 110 through the bit lines BL. The page buffer circuit 130 may read data stored in the memory cell array 110 by sensing voltage changes of the bit lines BL. The page buffer circuit 130 may store data in the memory cell array 110 by controlling voltages of the bit lines BL.

The input/output circuit 140 may receive data “DATA” from the external device (e.g., a memory controller) and may provide the received data “DATA” to the page buffer circuit 130. The input/output circuit 140 may receive the data “DATA” from the page buffer circuit 130 and may provide the received data “DATA” to the external device.

The control logic and voltage generating circuit 150 may receive a command CMD or a control signal CTRL from the external device (e.g., a memory controller) and may control various components of the memory device 100 in response to the received signals.

The control logic and voltage generating circuit 150 may generate various operation voltages used by the memory device 100 to operate. For example, the control logic and voltage generating circuit 150 may generate various operation voltages such as a plurality of program voltages, a plurality of pass voltages, a plurality of verify voltages, a plurality of read voltages, a plurality of non-selection read voltages, a plurality of erase voltages, and a plurality of erase verify voltages.

Figure 2A:
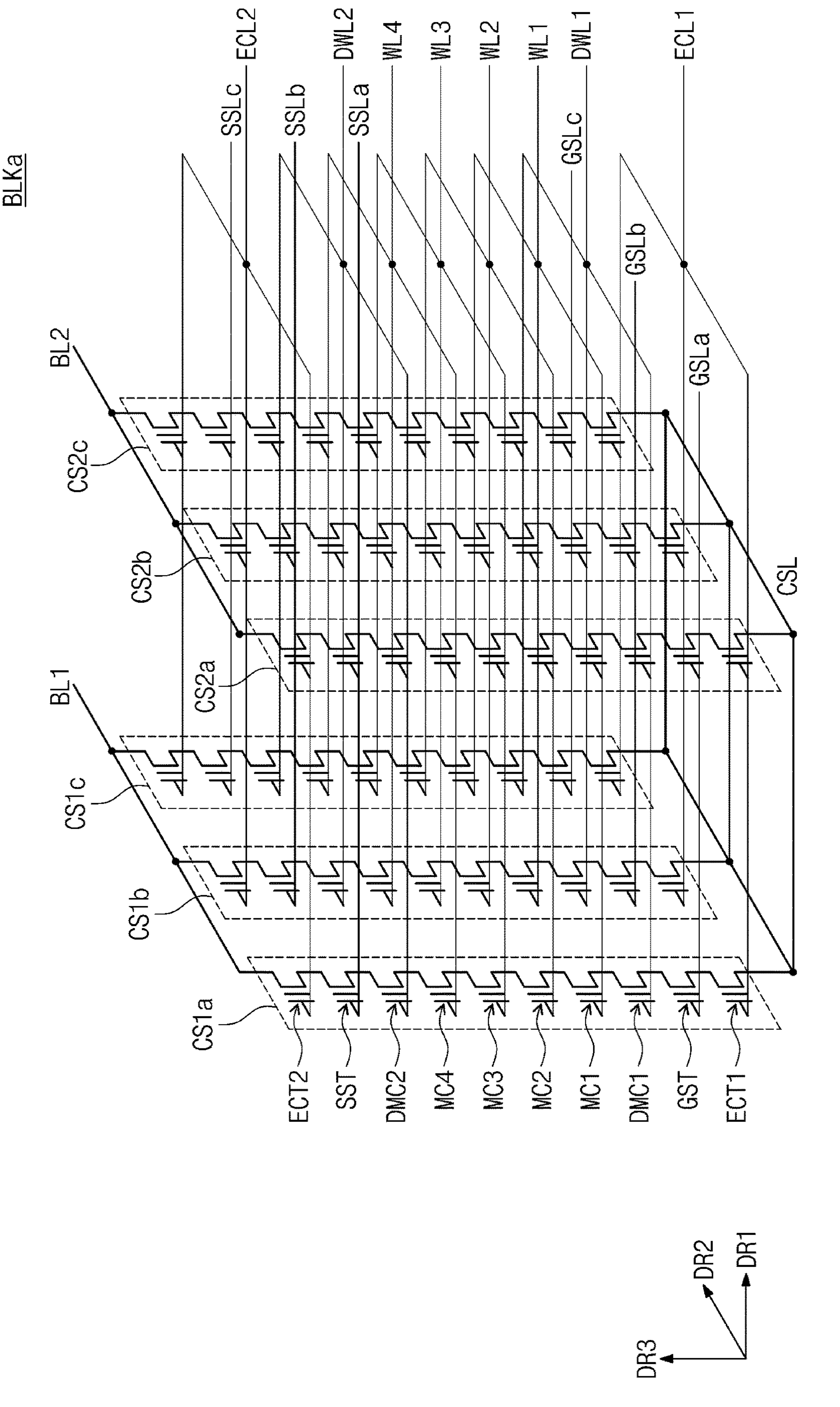
FIG. 2A is a circuit diagram illustrating one of a plurality of memory blocks included in a memory cell array in FIG. 1.
Figure 2B:
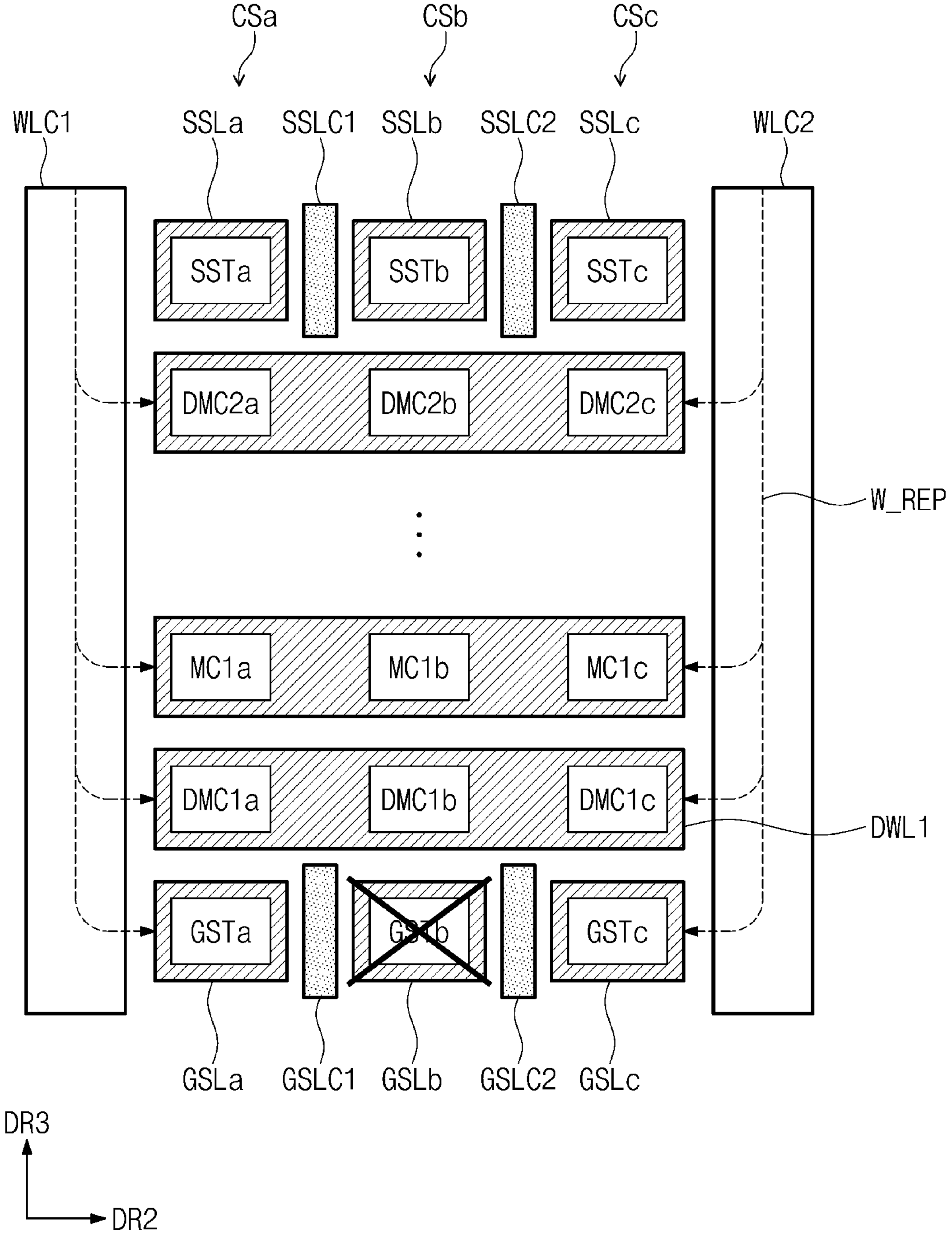
FIG. 2B is a diagram for describing a memory block of FIG. 2A.

FIG. 2A is a circuit diagram illustrating one of a plurality of memory blocks included in a memory cell array in FIG. 1. FIG. 2B is a diagrams for describing a memory block of FIG. 2A. A memory block of a three-dimensional structure will be described with reference to FIGS. 2A and 2B, but the present disclosure is not limited thereto. In an embodiment, a memory block BLKa is conceptually illustrated in FIG. 2B for easy description, and some components are omitted. However, it may be understood that an actual structure of the memory block BLKa may be different from that illustrated in FIGS. 2A and 2B.

In an embodiment, the memory block BLKa to be described with reference to FIGS. 2A and 2B may correspond to a physical erase unit of the memory device 100. However, the present disclosure is not limited thereto. For example, the memory device 100 may perform the erase operation in units of page, word line, sub-block, or plane.

In an embodiment, the memory block BLKa illustrated in FIG. 2A is only an example. The number of cell strings may increase or decrease, and the number of rows of cell strings and the number of columns of cell strings may increase or decrease depending on the number of cell strings. Also, the number of cell transistors (e.g., GST, MC, DMC, SST, and ECT) in the memory block BLKa may increase or decrease, and the height of the memory block BLKa may increase or decrease depending on the number of cell transistors (e.g., GST, MC, DMC, SST, and ECT). Also, the number of lines (i.e., GSL, WL, DWL, and SSL) connected to cell transistors may increase or decrease depending on the number of cell transistors.

Referring to FIGS. 2A and 2B, the memory block BLKa may include a plurality of cell strings CS1*a*, CS1*b*, CS1*c*, CS2*a*, CS2*b*, and CS2*c*. The plurality of cell strings CS1*a*, CS1*b*, CS1*c*, CS2*a*, CS2*b*, and CS2*c* may be arranged in a first direction DR1 (or a row direction) and a second direction DR2 (or a column direction) to form rows and columns.

The plurality of cell strings CS1*a*, CS1*b*, CS1*c*, CS2*a*, CS2*b*, and CS2*c* may be connected to bit lines BL1 and BL2. For example, the first and second bit lines BL1 and BL2 may extend in the second direction DR2. The cell strings CS1*a*, CS1*b*, and CS1*c* placed at the same column, that is, the first column from among the plurality of cell strings CS1*a*, CS1*b*, CS1*c*, CS2*a*, CS2*b*, and CS2*c* may be connected to the first bit line BL1. The cell strings CS2*a*, CS2*b*, and CS2*c* placed at the same column, that is, the second column from among the plurality of cell strings CS1*a*, CS1*b*, CS1*c*, CS2*a*, CS2*b*, and CS2*c* may be connected to the second bit line BL2. It will be understood that when an element is referred to as being “connected” or “coupled” to or “on” another element, it can be directly connected or coupled to or on the other element or intervening elements may be present. In contrast, when an element is referred to as being “directly connected” or “directly coupled” to another element, or as “contacting” or “in contact with” another element, there are no intervening elements present at the point of contact. Other words used to describe the relationship between elements should be interpreted in a like fashion (e.g., “between” versus “directly between," "adjacent" versus "directly adjacent," etc.). Components may be electrically and/or physically connected to each other. Items described as being "electrically connected" are configured such that an electrical signal can be passed from one item to the other. In some cases, where a transistor is used to control whether a current can flow through a cell string or other circuit, components on opposite source and drain sides of the transistor may be described as being connected or disconnected, which refers to whether at that time, a current is able to be transmitted from one of the components to the other (e.g., depending on whether the transistor is on or off).

Each of the plurality of cell strings CS1*a*, CS1*b*, CS1*c*, CS2*a*, CS2*b*, and CS2*c* may include a plurality of cell transistors. For example, in each cell string, the plurality of cell transistors may include a string selection transistor SST, a plurality of memory cells MC1 to MC4, a plurality of dummy memory cells DMC1 and DMC2, a ground selection transistor GST, and a plurality of erase control transistors ECT1 and ECT2. Each of the plurality of cell transistors may be implemented with a charge trap flash (CTF) memory cell.

The plurality of memory cells MC1 to MC4 may be connected in series and may be stacked in a third direction DR3 (or a height direction) perpendicular to a plane defined by the first and second directions DR1 and DR2 or a substrate. The string selection transistor SST may be provided between the plurality of memory cells MC1 to MC4 and the bit line BL1 or BL2. The ground selection transistor GST may be provided between the plurality of memory cells MC1 to MC4 and the common source line CSL.

In an embodiment, the first dummy memory cell DMC1 may be provided between the plurality of memory cells MC1 to MC4 and the ground selection transistor GST. In an embodiment, the second dummy memory cell DMC2 may be provided between the string selection transistor SST and the plurality of memory cells MC1 to MC4.

In an embodiment, the first erase control transistor ECT1 may be provided between the ground selection transistor GST and the common source line CSL. The second erase control transistor ECT2 may be provided between the bit line BL1 or BL2 and the string selection transistor SST. The erase control transistors ECT1 and ECT2 may be used to charge channels of the cell strings CS1*a*, CS1*b*, CS1*c*, CS2*a*, CS2*b*, and CS2*c* with an erase voltage or to erase the memory block BLKa, based on a gate induced drain leakage (GIDL) phenomenon.

The first erase control transistors ECT1 of the plurality of cell strings CS1*a*, CS1*b*, CS1*c*, CS2*a*, CS2*b*, and CS2*c* may be connected in common with a first erase control line ECL1. The second erase control transistors ECT2 of the plurality of cell strings CS1*a*, CS1*b*, CS1*c*, CS2*a*, CS2*b*, and CS2*c* may be connected in common with a second erase control line ECL2.

Among the plurality of memory cells MC1 to MC4, memory cells of the same height from the substrate or the ground selection transistor GST may be connected in common with the same word line, and memory cells of different heights may be connected with different word lines. For example, the first memory cells MC1 of the plurality of cell strings CS1*a*, CS1*b*, CS1*c*, CS2*a*, CS2*b*, and CS2*c* may be placed at the same height from the substrate and may be connected in common with a first word line WL1. The second memory cells MC2 of the plurality of cell strings CS1*a*, CS1*b*, CS1*c*, CS2*a*, CS2*b*, and CS2*c* may be placed at the same height from the substrate and may be connected in common with a second word line WL2. Likewise, the third memory cells MC3 of the plurality of cell strings CS1*a*, CS1*b*, CS1*c*, CS2*a*, CS2*b*, and CS2*c* may be placed at the same height from the substrate and may be connected in common with a third word line WL3, and the fourth memory cells MC4 of the plurality of cell strings CS1*a*, CS1*b*, CS1*c*, CS2*a*, CS2*b*, and CS2*c* may be placed at the same height from the substrate and may be connected in common with a fourth word line WL4.

The first dummy memory cells DMC1 placed at the same height from the substrate may be connected in common to a first dummy word line DWL1. The second dummy memory cells DMC2 placed at the same height from the substrate may be connected in common to a second dummy word line DWL2.

String selection transistors placed at the same row from among string selection transistors placed at the same height from the substrate may be connected with the same string selection line, and string selection transistors placed at different rows may be connected with different respective string selection lines. For example, the string selection transistors SST of the cell strings CS1*a* and CS2*a* in the first row may be connected in common with an a-th string selection line SSLa; the string selection transistors SST of the cell strings CS1*b* and CS2*b* in the second row may be connected in common with a b-th string selection line SSLb; the string selection transistors SST of the cell strings CS1*c* and CS2*c* in the third row may be connected in common with a c-th string selection line SSLc. In an embodiment, as the string selection transistors SST are connected with the string selection lines SSLa, SSLb, and SSLc individually in units of rows, the plurality of cell strings CS1*a*, CS1*b*, CS1*c*, CS2*a*, CS2*b*, and CS2*c* may be individually controlled.

Ground selection transistors placed at the same row from among ground selection transistors placed at the same height from the substrate may be connected with the same ground selection line, and ground selection transistors placed at different rows may be connected with different ground selection lines. For example, the ground selection transistors GST of the cell strings CS1*a* and CS2*a* in the first row may be connected in common with an a-th ground selection lines GSLa; the ground selection transistors GST of the cell strings CS1*b* and CS2*b* in the second row may be connected in common with a b-th ground selection lines GSLb; the ground selection transistors GST of the cell strings CS1*c* and CS2*c* in the third row may be connected in common with a c-th ground selection lines GSLc.

In an embodiment, the ground selection transistors GST may be connected in common with the same ground selection line (i.e., one ground selection line). In this case, as the plurality of cell strings are controlled by the same ground selection line, in a read operation or a verify operation, a ground selection transistor of an unselected cell string may be turned on, thereby causing the reduction of reliability, the reduction of performance, and an increase of power consumption.

In contrast, as the ground selection transistors GST are connected with the ground selection lines GSLa, GSLb, and GSLc individually in units of rows, the plurality of cell strings CS1*a*, CS1*b*, CS1*c*, CS2*a*, CS2*b*, and CS2*c* may be individually controlled. In this case, in the read operation or the verify operation, a ground selection transistor of an unselected cell string may be turned off, thus preventing the reduction of reliability, the reduction of performance, and an increase of power consumption.

In an embodiment, in the case where the ground selection transistors GST are connected with the ground selection lines GSLa, GSLb, and GSLc individually in units of rows, a ground selection line(s) (e.g., GSLb) may not be formed normally in the process of manufacturing the memory device 100.

For example, as illustrated in FIG. 2B, the memory block BLKa may include a first word line cut WLC1 and a second word line cut WLC2. In this case, three cell strings Csa, CSb, and CSc may be present between the first and second word line cuts WLC1 and WLC2. The a-th cell string Csa may include cell transistors (e.g., SSTa, DMC2*a*, MC1*a*, DMC1*a*, and GSTa), the b-th cell string CSb may include cell transistors (e.g., SSTb, DMC2*b*, MC1*b*, DMC1*b*, and GSTb), and the c-th cell string CSc may include cell transistors (e.g., SSTc, DMC2*c*, MC1*c*, DMC1*c*, and GSTc).

The first dummy memory cells DMC1*a*, DMC1*b*, and DMClc of the same height from the substrate may be connected in common with the first dummy word line DWL1, the first memory cells MC1*a*, MC1*b*, and MClc of the same height from the substrate may be connected in common with the first word line WL1, and the second dummy memory cells DMC2*a*, DMC2*b*, and DMC2*c* of the same height from the substrate may be connected in common with the second dummy word line DWL2. The string selection transistor SSTa of the a-th cell string Csa may be connected with the a-th string selection line SSLa, the string selection transistor SSTb of the b-th cell string CSb may be connected with the b-th string selection line SSLb, and the string selection transistor SSTc of the c-th cell string CSc may be connected with the c-th string selection line SSLc.

In an embodiment, various lines (e.g., GSL, DWL, WL, and SSL) included in the memory block BLKa may be formed through the first and second word line cuts WLC1 and WLC2 (e.g., via the first and second word line cuts WLC1 and WLC2). For example, in the process of manufacturing the memory device 100, a word line replacement process WL_REP may be performed through the first and second word line cuts WLC1 and WLC2, and various lines (e.g., GSL, DWL, WL, and SSL) included in the memory block BLKa may be formed through the word line replacement process WL_REP. The word line replacement process WL_REP may refer to a process of replacing an oxide material between the first and second word line cuts WLC1 and WLC2 with a conductive material.

In an embodiment, string selection line separation structures SSLC1 and SSLC2 may be present between the string selection lines SSLa, SSLb, and SSLc. The string selection lines SSLa, SSLb, and SSLc may be separated from each other by the string selection line separation structures SSLC1 and SSLC2.

Ground selection line separation structures GSLC1 and GSLC2 for separating the ground selection lines GSLa, GSLb, and GSLc from each other may be used. However, in the case where the ground selection line separation structures GSLC1 and GSLC2 are formed as illustrated in FIG. 2B, the b-th ground selection lines GSLb placed between the ground selection line separation structures GSLC1 and GSLC2 may not be formed normally. For example, as described above, the ground selection lines GSLa, GSLb, and GSLc are formed through the first and second word line cuts WLC1 and WLC2. In this case, because the b-th ground selection lines GSLb placed between the ground selection line separation structures GSLC1 and GSLC2 are not connected with the first and second word line cuts WLC1 and WLC2, the b-th ground selection lines GSLb may not be formed properly through the word line replacement process WL_REP.

Figure 3:
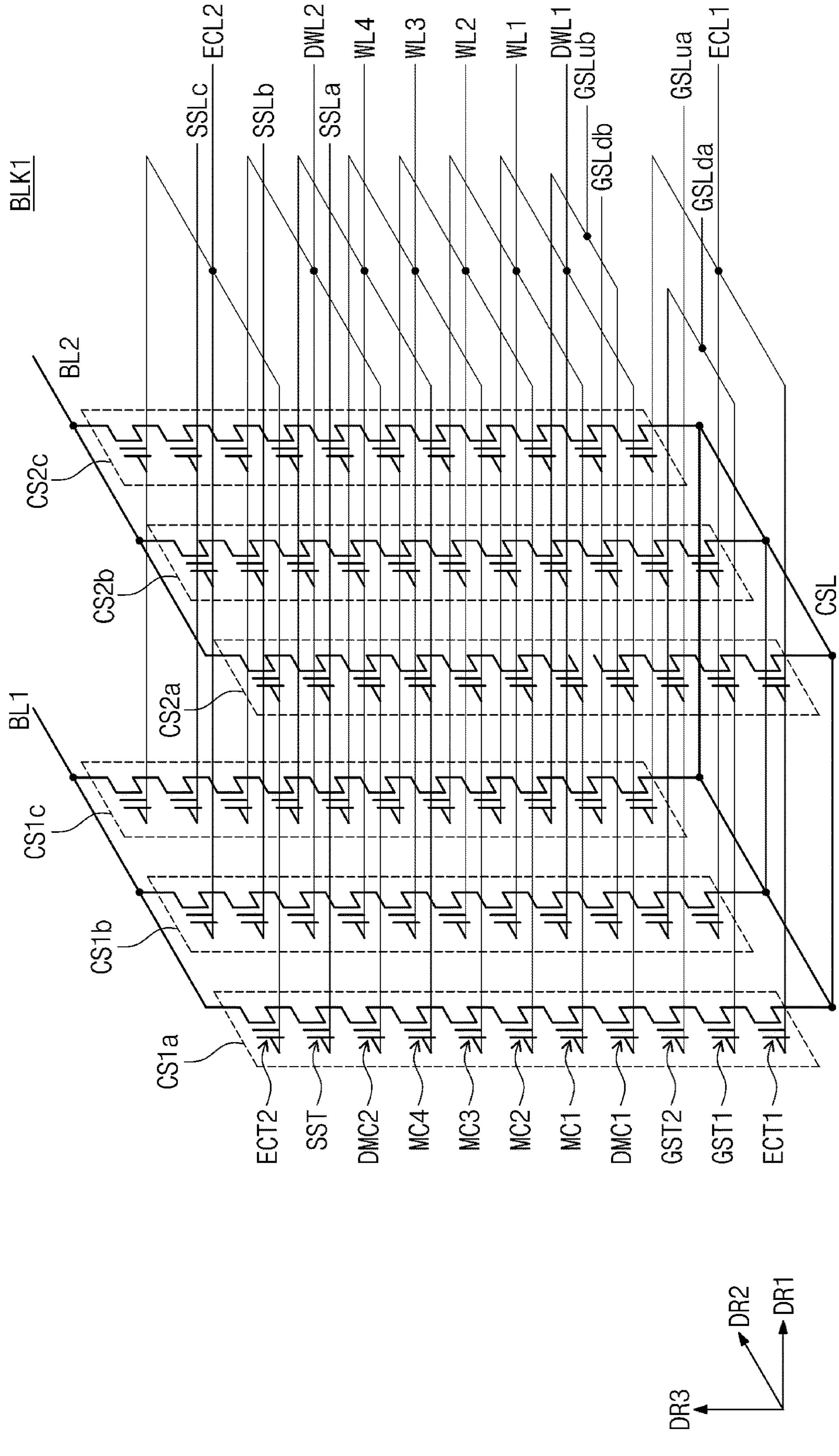
FIG. 3 is a circuit diagram illustrating one of a plurality of memory blocks included in a memory cell array in FIG. 1.
Figure 4:
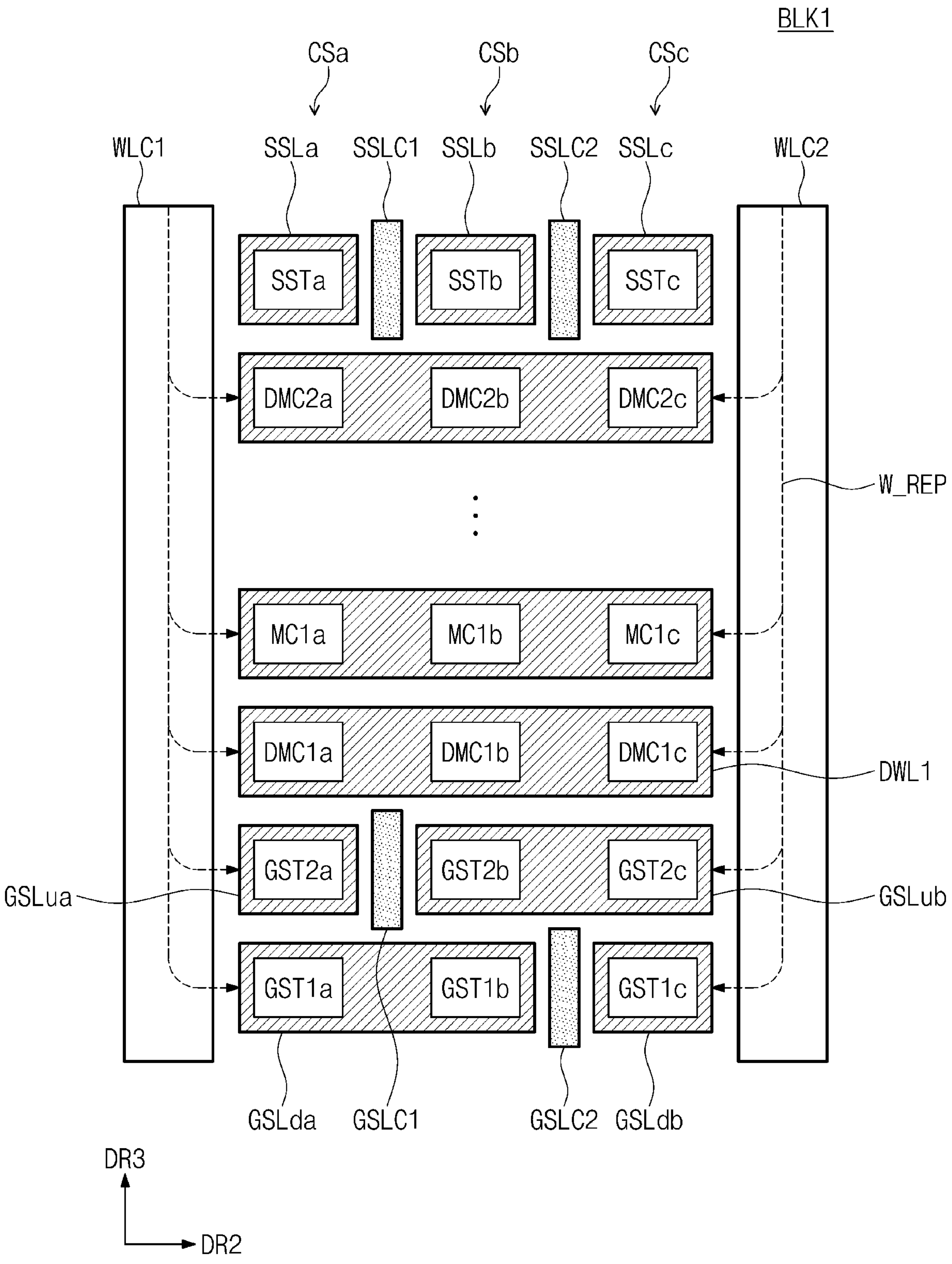
FIG. 4 is a diagram for describing a memory block of FIG. 3.

FIG. 3 is a circuit diagram illustrating one of a plurality of memory blocks included in a memory cell array in FIG. 1. FIG. 4 is a diagram for describing a memory block of FIG. 3. A first memory block BLK1 is conceptually illustrated in FIG. 4 for easy description, and some components are omitted. However, it may be understood that an actual structure of the first memory block BLK1 may be different from that illustrated in FIGS. 3 and 4. For brief description, the description given with reference to the above components will be omitted to avoid redundancy.

Referring to FIGS. 1 and 3, the first memory block BLK1 may include the plurality of cell strings CS1*a*, CS1*b*, CS1*c*, CS2*a*, CS2*b*, and CS2*c*. The plurality of cell strings CS1*a*, CS1*b*, CS1*c*, CS2*a*, CS2*b*, and CS2*c* may be connected with the bit lines BL1 and BL2. Each of the plurality of cell strings CS1*a*, CS1*b*, CS1*c*, CS2*a*, CS2*b*, and CS2*c* may include a plurality of cell transistors (e.g., ECT1, DMC1, MC1~MC4, DMC2, SST, and ECT2), and the plurality of cell transistors may be respectively connected with various lines (e.g., ECL1, DWL1, WL1 to WL4, DWL2, SSLa, SSLb, SSLc, and ECL2).

In an embodiment, each of the plurality of cell strings CS1*a*, CS1*b*, CS1*c*, CS2*a*, CS2*b*, and CS2*c* may include a first ground selection transistor GST1 and a second ground selection transistor GST2. The first and second ground selection transistors GST1 and GST2 may be connected in series and may be provided between the first dummy memory cell DMC1 and the common source line CSL (or the first erase control transistor ECT1).

The first and second ground selection transistors GST1 and GST2 of the plurality of cell strings CS1*a*, CS1*b*, CS1*c*, CS2*a*, CS2*b*, and CS2*c* may be connected with ground selection lines GSLda, GSLdb, GSLua, and GSLub.

The first ground selection transistors GST1 of the cell strings CS1*a*, CS2*a*, CS1*b*, and CS2*b* placed at the first and second rows may be connected in common with an a-th lower ground selection lines GSLda. The first ground selection transistors GST1 of the cell strings CSlc and CS2*c* placed at the third row may be connected in common with a b-th lower ground selection lines GSLdb.

The second ground selection transistors GST2 of the cell strings CS1*a* and CS2*a* placed at the first row may be connected in common with an a-th upper ground selection lines GSLua. The second ground selection transistors GST2 of the cell strings CS1*b*, CS2*b*, CS1*c*, and CS2*c* placed at the second and third rows may be connected in common with a b-th upper ground selection lines GSLub.

That is, the ground selection lines GSLda, GSLdb, GSLua, and GSLub may have an asymmetric structure, and may have a different structure at different vertical levels. For example, as illustrated in FIG. 4, the first memory block BLK1 may include three cell strings placed between the first word line cut WLC1 and the second word line cut WLC2.

In this case, the first ground selection transistors GSTla and GST1*b* of the a-th and b-th cell strings Csa and CSb may be connected with the a-th lower ground selection lines GSLda, and the first ground selection transistor GSTlc of the c-th cell string CSc may be connected with the b-th lower ground selection lines GSLdb. The second ground selection transistor GST2*a* of the a-th cell string Csa may be connected with the a-th upper ground selection lines GSLua, and the second ground selection transistors GST2*b* and GST2*c* of the b-th and c-th cell string CSb and CSc may be connected with the b-th upper ground selection lines GSLub. While the figures show a certain structure at the first vertical level corresponding to the first ground selection transistors and a certain structure at the second vertical level corresponding to the second ground selection transistors, this structures can be different from those shown. For example, the structures may be reversed in orientation. Also, it should be noted that terms such as "first" and "second" may be used throughout this specification and in the claims to refer to different components, and are simply used as a naming convention unless the context indicates otherwise.

The first ground selection line separation structure GSLC1 may be provided to separate the a-th and b-th upper ground selection lines GSLua and GSLub from each other. The second ground selection line separation structure GSLC2 may be provided to separate the a-th and b-th lower ground selection lines GSLda and GSLdb from each other.

In an embodiment, the first and second ground selection line separation structures GSLC1 and GSLC2 may be provided in different layers or at different heights from the substrate, and may not overlap each other when viewed from above a plane parallel to the substrate. For example, the first ground selection line separation structure GSLC1 may be formed in a layer or region where the a-th and b-th upper ground selection lines GSLua and GSLub are formed. The second ground selection line separation structure GSLC2 may be formed in a layer or region where the a-th and b-th lower ground selection lines GSLda and GSLdb are formed. The first ground selection line separation structure GSLC1 may be formed between the second ground selection transistor GST2*a* of the a-th cell string Csa and the second ground selection transistor GST2*b* of the b-th cell string CSb. The second ground selection line separation structure GSLC2 may be formed between the first ground selection transistor GST1*b* of the b-th cell string CSb and the first ground selection transistor GSTlc of the c-th cell string CSc.

In an embodiment, the first ground selection line separation structure GSLC1 may overlap the first string selection line separation structure SSLC1 when viewed from above a plane parallel to the substrate. The second ground selection line separation structure GSLC2 may overlap the second string selection line separation structure SSLC2 when viewed from above a plane parallel to the substrate.

As described above, in the case where the first and second ground selection line separation structures GSLC1 and GSLC2 are formed, all the ground selection lines GSLua, GSLub, GSLda, and GSLdb may be formed normally through the word line replacement process WL_REP. For example, as illustrated in FIG. 4, as only one ground selection line separation structure (e.g., GSLC1 or GSLC2) is formed between the first and second word line cuts WLC1 and WLC2 at a particular height from the substrate (e.g., from a top surface of the substrate), all the ground selection lines GSLua, GSLub, GSLda, and GSLdb may be connected with the first and second word line cuts WLC1 and WLC2. In this case, all the ground selection lines GSLua, GSLub, GSLda, and GSLdb may be formed normally through the word line replacement process WL_REP, and improperly or insufficiently formed ground selection lines may be avoided.

In an embodiment, as described above, in the case where three or more cell strings connected with the same bit line are present between word line cuts (e.g., WLC1 and WLC2), ground selection lines may be formed in at least two layers located at different heights; in each layer, a ground selection line may be divided into two lines (e.g., two electrically separated lines). In this case, when viewed from above a plane parallel to the substrate, a ground selection line separation structure for separating ground selection lines in a first layer may not overlap a ground selection line separation structure for separating ground selection lines in a second layer different from the first layer. As such, all the ground selection lines may be connected with word line cuts and may be formed normally through the word line replacement process WL_REP.

In an embodiment, as described above, in the case where ground selection lines are formed in an asymmetric structure, ground selection transistors may operate independently of each other for each cell string. For example, in the embodiment of FIGS. 3 and 4, in the read operation, in the case where the a-th cell string Csa is a selected cell string, an on-voltage may be applied to the a-th upper ground selection lines GSLua and the a-th lower ground selection lines GSLda, and an off-voltage may be applied to the b-th upper ground selection lines GSLub and the b-th lower ground selection lines GSLdb. As such, the selected cell string (e.g., Csa) may be connected with the common source line CSL, and the unselected cell strings CSb and CSc may not be connected with the common source line CSL. Accordingly, as ground selection lines are normally formed through the asymmetric structure and independent operations of a selected cell string and an unselected cell string are secured, the reduction of reliability, the reduction of performance, and an increase of power consumption may be prevented.

Figure 5A:
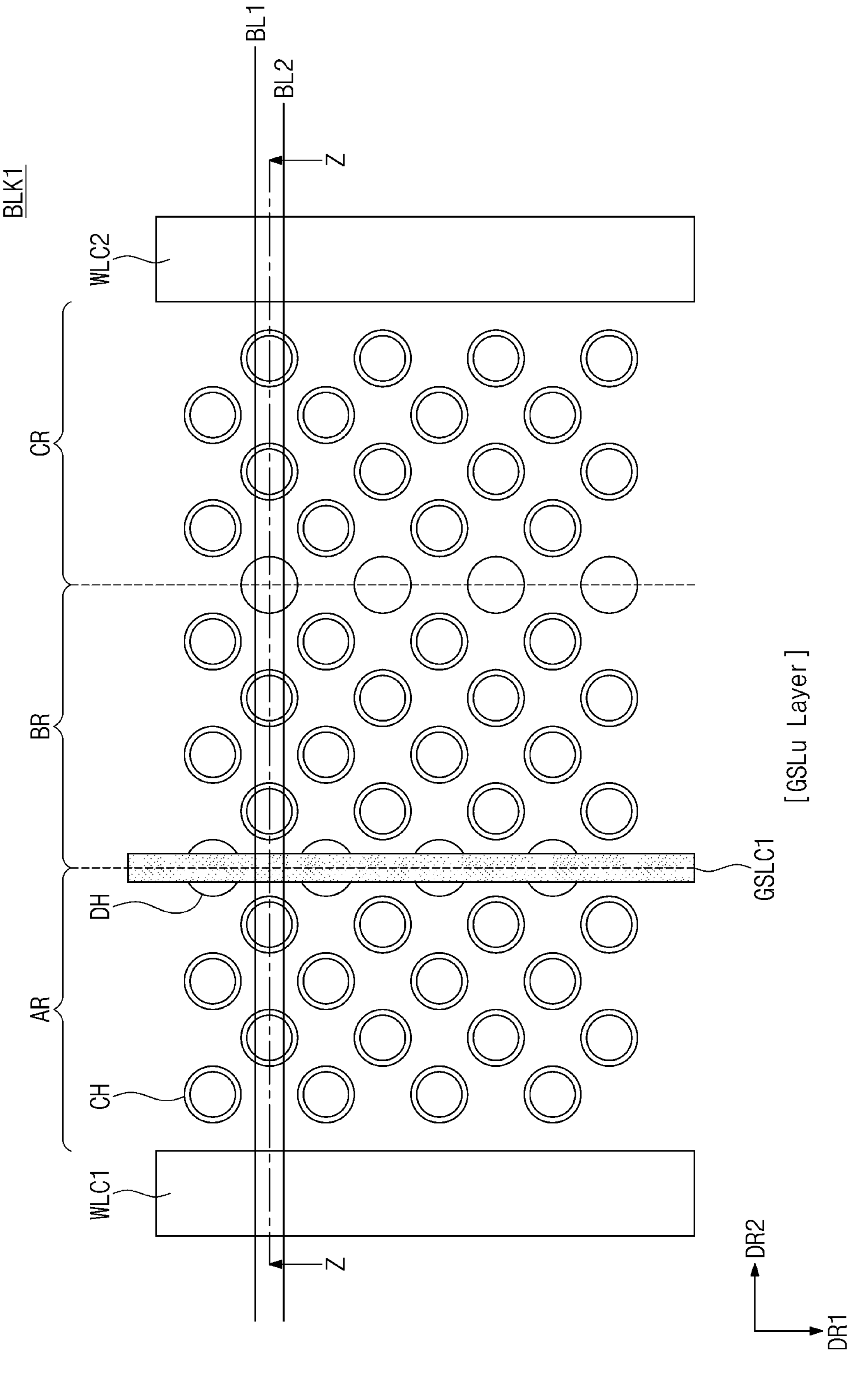
FIGS. 5A and 5B are plan views illustrating layers in which an upper ground selection line and a lower ground selection line of FIG. 4 are formed.
Figure 5B:
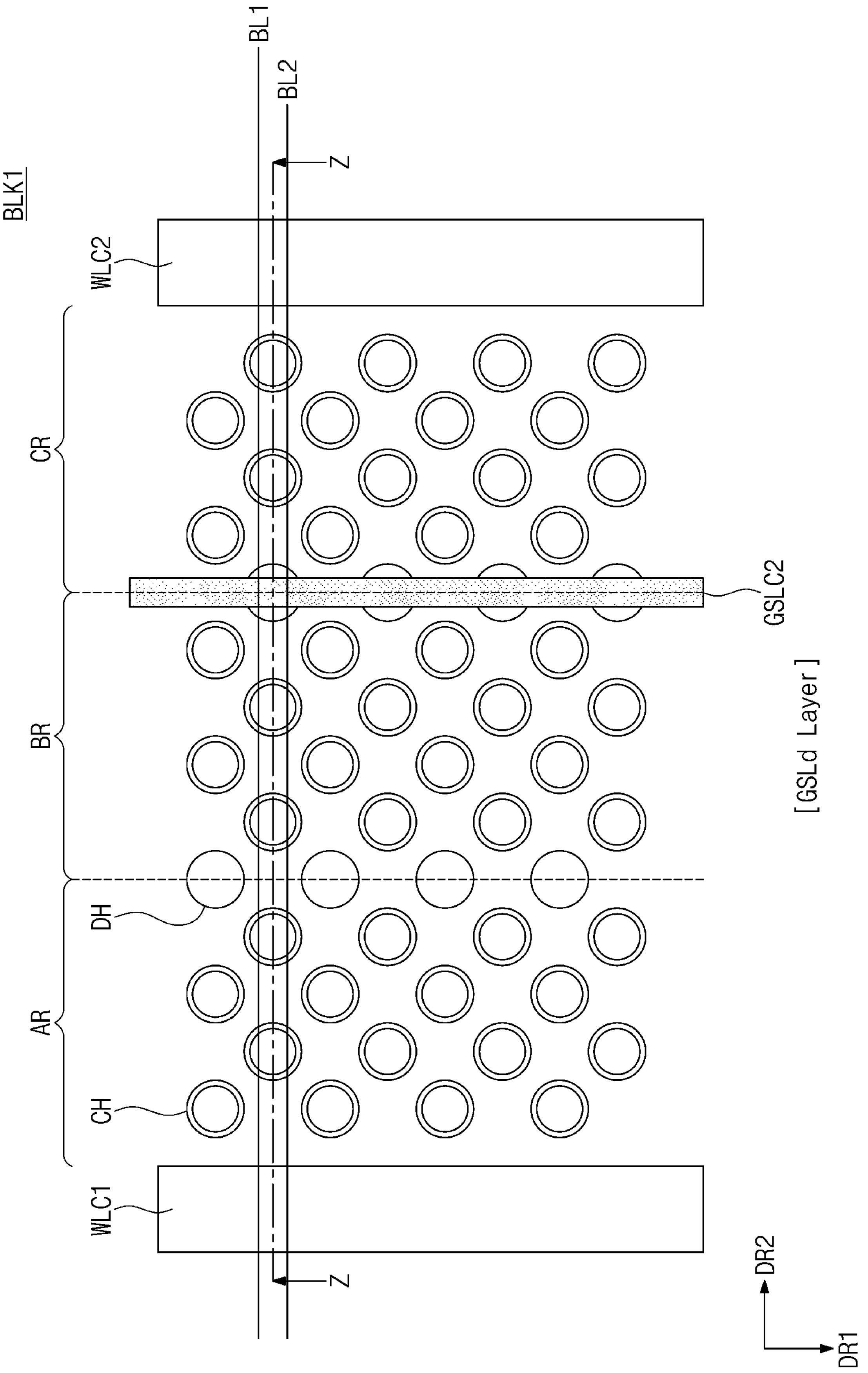

FIGS. 5A and 5B are plan views illustrating layers in which an upper ground selection line and a lower ground selection line of FIG. 4 are formed. In an embodiment, the plan views of FIGS. 5A and 5B are plan views associated with a plane defined by the first direction DR1 and the second direction DR2 (or a plane parallel to the substrate).

Referring to FIGS. 1, 3, 4, 5A, and 5B, the first memory block BLK1 may include the first word line cut WLC1 and the second word line cut WLC2. A plurality of channel holes CH and a plurality of dummy holes DH may be formed between the first and second word line cuts WLC1 and WLC2.

Each of the plurality of channel holes CH may correspond to one cell string. For example, the channel hole CH may be formed in a direction perpendicular to the substrate. The channel hole CH may include a plurality of cell transistors (e.g., ECT1, GST1, GST2, DMC1, MC1 to MC4, DCM2, SST, and ECT2).

The plurality of dummy holes DH may not include cell transistors. Alternatively, cell transistors included in the plurality of dummy holes DH may not be used for an operation of the first memory block BLK1, even if they include some transistors. For example, a row in which a plurality of dummy holes DH are disposed may not be written to or read from during any operation of the memory cell array. In an embodiment, a region where the plurality of dummy holes DH are formed may be a region for forming the ground selection line separation structures GSLC1 and GSLC2.

For example, as illustrated in FIG. 5A, a region between the first and second word line cuts WLC1 and WLC2 may be divided into an A-th region AR, a B-th region BR, and a C-th region CR. The A-th, B-th, and C-th regions AR, BR, and CR may be partitioned based on locations of the plurality of dummy holes DH. Cell strings respectively corresponding to a channel hole CH in the A-th region AR may be connected with the a-th string selection line SSLa. Cell strings respectively corresponding to a channel hole CH in the B-th region BR may be connected with the b-th string selection line SSLb. Cell strings respectively corresponding to a channel hole CH in the C-th region CR may be connected with the b-th string selection line SSLb.

The first and second bit lines BL1 and BL2 may extend on the channel holes CH arranged in the second direction DR2 (or column direction). The first bit line BL1 may be connected with one of channel holes CH included in the A-th region AR, one of the channel holes CH included in the B-th region BR, and one of the channel holes CH included in the C-th region CR, and the second bit line BL2 may be connected with another one of channel holes CH included in the A-th region AR, another one of the channel holes CH included in the B-th region BR, and another one of the channel holes CH included in the C-th region CR.

In this case, as illustrated in FIG. 5A, the first ground selection line separation structure GSLC1 may be formed between the A-th region AR and the B-th region BR in a layer for forming an upper ground selection line GSLu. In an embodiment, the first ground selection line separation structure GSLC1 may be formed in a region where the first ground selection line separation structure GSLC1 overlaps the dummy holes DH between the A-th region AR and the B-th region BR. As illustrated in FIG. 5B, the second ground selection line separation structure GSLC2 may be formed between the B-th region BR and the C-th region CR in a layer for forming a lower ground selection line GSLd. In an embodiment, the second ground selection line separation structure GSLC2 may be formed in a region where the second ground selection line separation structure GSLC2 overlaps the dummy holes DH between the B-th region BR and the C-th region CR.

In an embodiment, the layer (e.g., a GSLu layer of FIG. 5A) for forming the upper ground selection line GSLu and the layer (e.g., a GSLd layer of FIG. 5B) for forming the lower ground selection line GSLd may be placed at different heights from the substrate.

Figure 6:
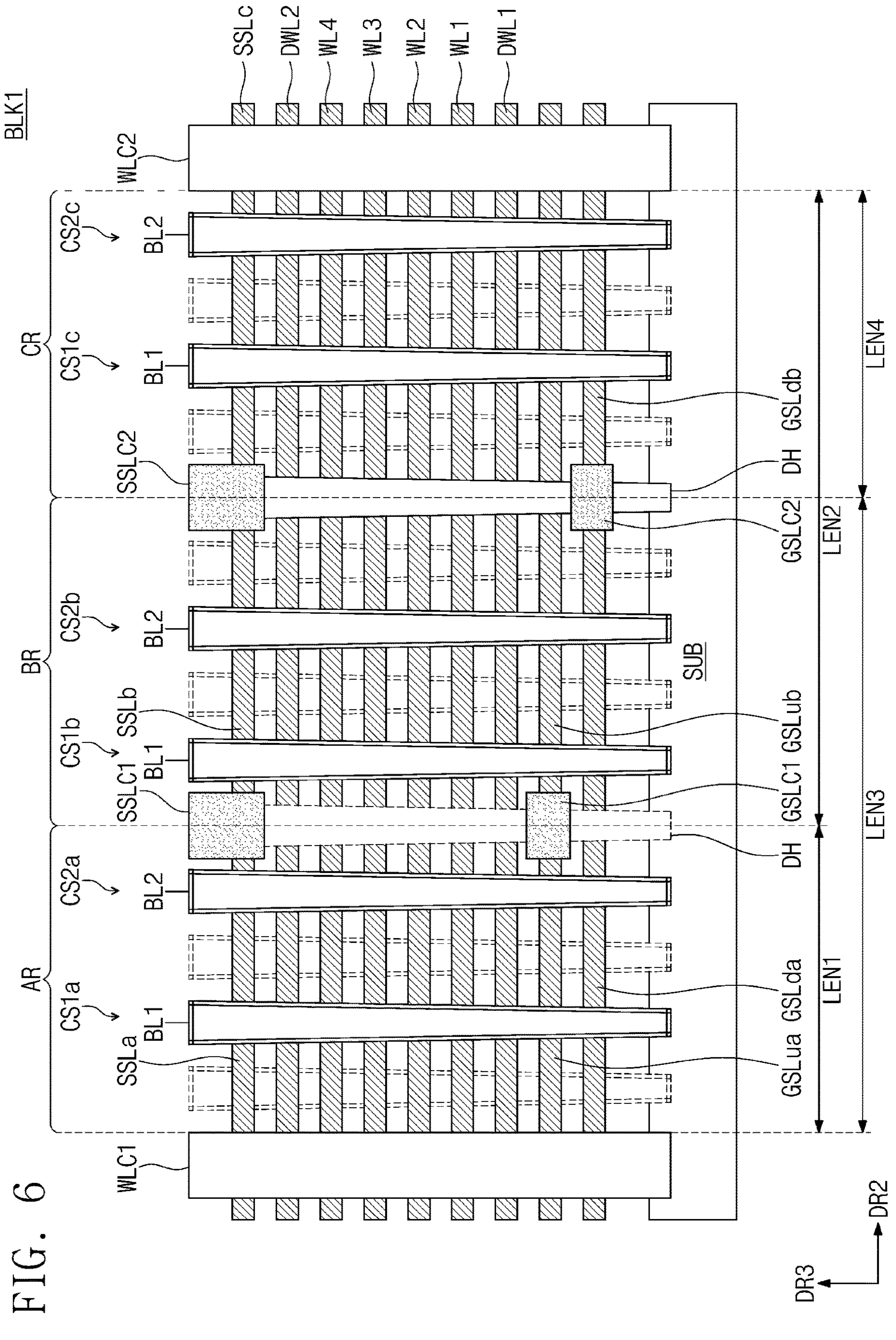
FIG. 6 is a vertical cross-sectional view of a memory block of FIG. 3.

FIG. 6 is a vertical cross-sectional view of a memory block of FIG. 3. In an embodiment, the vertical cross-sectional view of FIG. 6 is a cross-sectional view of the first memory block BLK1 taken along line Z-Z of FIGS. 5A and 5B. Referring to FIGS. 3, 5A, 5B, and 6, the first memory block BLK1 may include the plurality of cell strings CS1*a*, CSlb, CSlc, CS2*a*, CS2*b*, and CS2*c* formed on a substrate SUB. The plurality of cell strings CS1*a*, CSlb, CSlc, CS2*a*, CS2*b*, and CS2*c* may be formed between the first word line cut WLC1 and the second word line cut WLC2. The plurality of cell strings CS1*a*, CSlb, CSlc, CS2*a*, CS2*b*, and CS2*c* may respectively correspond to the plurality of channel holes CH placed on line Z-Z described with reference to FIGS. 5A and 5B. The cell strings CS1*a* and CS2*a* may correspond to the channel holes CH formed in the A-th region AR, the cell strings CS1*b* and CS2*b* may correspond to the channel holes CH formed in the B-th region BR, and the cell strings CS1*c* and CS2*c* may correspond to the channel holes CH formed in the C-th region CR.

The cell string CS1*a* of the A-th region AR, the cell string CSlb of the B-th region BR, and the cell string CS1*c* of the C-th region CR may be connected to the first bit line BL1 extending in the second direction DR2 (e.g., via bit line contacts), and the cell string CS2*a* of the A-th region AR, the cell string CS2*b* of the B-th region BR, and the cell string CS2*c* of the C-th region CR may be connected to the second bit line BL2 extending in the second direction DR2 (e.g., via bit line contacts).

The cell strings CS1*a* and CS2*a* of the A-th region AR may be connected to the a-th string selection line SSLa, the cell strings CSlb and CS2*b* of the B-th region BR may be connected to the b-th string selection line SSLb, and the cell strings CS1*c* and CS2*c* of the C-th region CR may be connected to the c-th string selection line SSLc.

The plurality of cell strings CS1*a*, CSlb, CSlc, CS2*a*, CS2*b*, and CS2*c* may be connected in common to the first dummy word line DWL1, the plurality of word lines WL1, WL2, WL3, and WL4, and the second dummy word line DWL2.

The cell strings CS1*a* and CS2*a* of the A-th region AR may be connected to the a-th upper ground selection lines GSLua, and the cell strings CS1*b* and CS2*b* of the B-th region BR and the cell strings CS1*c* and CS2*c* of the C-th region CR may be connected to the b-th upper ground selection lines GSLub.

The cell strings CS1*a* and CS2*a* of the A-th region AR and the cell strings CS1*b* and CS2*b* of the B-th region BR may be connected to the a-th lower ground selection lines GSLda, and the cell strings CS1*c* and CS2*c* of the C-th region CR may be connected to the b-th lower ground selection lines GSLdb.

In an embodiment, a length of the a-th upper ground selection lines GSLua in the second direction DR2 may be a first length LEN1; a length of the b-th upper ground selection lines GSLub in the second direction DR2 may be a second length LEN2 longer than the first length LEN1; a length of the a-th lower ground selection lines GSLda in the second direction DR2 may be a third length LEN3; a length of the b-th lower ground selection lines GSLdb in the second direction DR2 may be a fourth length LEN4 shorter than the third length LEN3.

In an embodiment, the first string selection line separation structure SSLC1 for separating the a-th and b-th string selection lines SSLa and SSLb may be placed in a layer (or at a height) where a string selection line is formed and may be formed in a region in which the dummy holes DH between the A-th and B-th regions AR and BR are formed. In an embodiment, the second string selection line separation structure SSLC2 for separating the b-th and c-th string selection lines SSLb and SSLc may be placed in the layer (or at the height) where the string selection line is formed and may be formed in a region in which the dummy holes DH between the B-th and C-th regions BR and CR are formed.

In an embodiment, as it goes toward the substrate SUB, a width or diameter of each channel hole CH or each dummy hole DH may decrease. In this case, in the layers where the ground selection lines GSLua, GSLub, GSLda, and GSLdb are formed, a length of each of the first and second ground selection line separation structures GSLC1 and GSLC2 in the second direction DR2 may be greater than the diameter of the dummy holes DH in the corresponding layer.

As described above, the ground selection line separation structures GSLC1 and GSLC2 for separating ground selection lines in the asymmetric structure may extend in a direction (e.g., a horizontal direction) perpendicular to the bit lines BL1 and BL2 and may not overlap each other, when viewed from above a plane parallel to the substrate SUB-.new In this case, the ground selection line separation structures GSLC1 and GSLC2 may be placed at different heights from the substrate SUB. As such, in a region between word line cuts, because only one ground selection line separation structure is formed in one layer for forming the ground selection line GSL, the ground selection lines GSL may be normally formed, and the connection of the common source line CSL with each cell string may be independently controlled, for example by independent ground select signal lines that receive different ground select signals over different paths, and/or that are electrically isolated from each other or can be switchably electrically separated from each other.

Figure 7A:
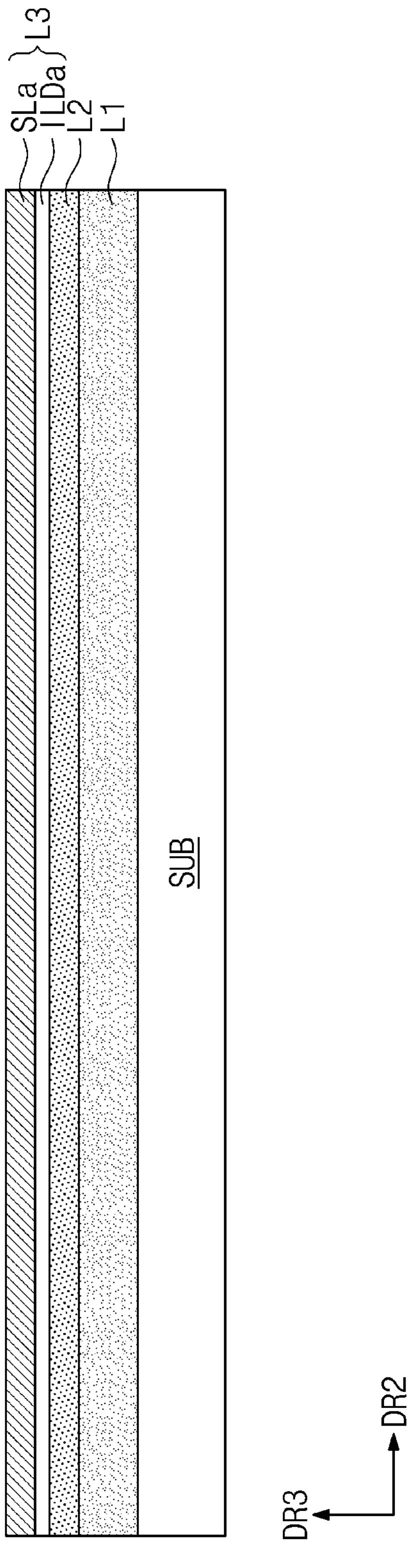
FIGS. 7A to 7E are cross-sectional views for describing a process of manufacturing a memory block of FIG. 6.
Figure 7B:
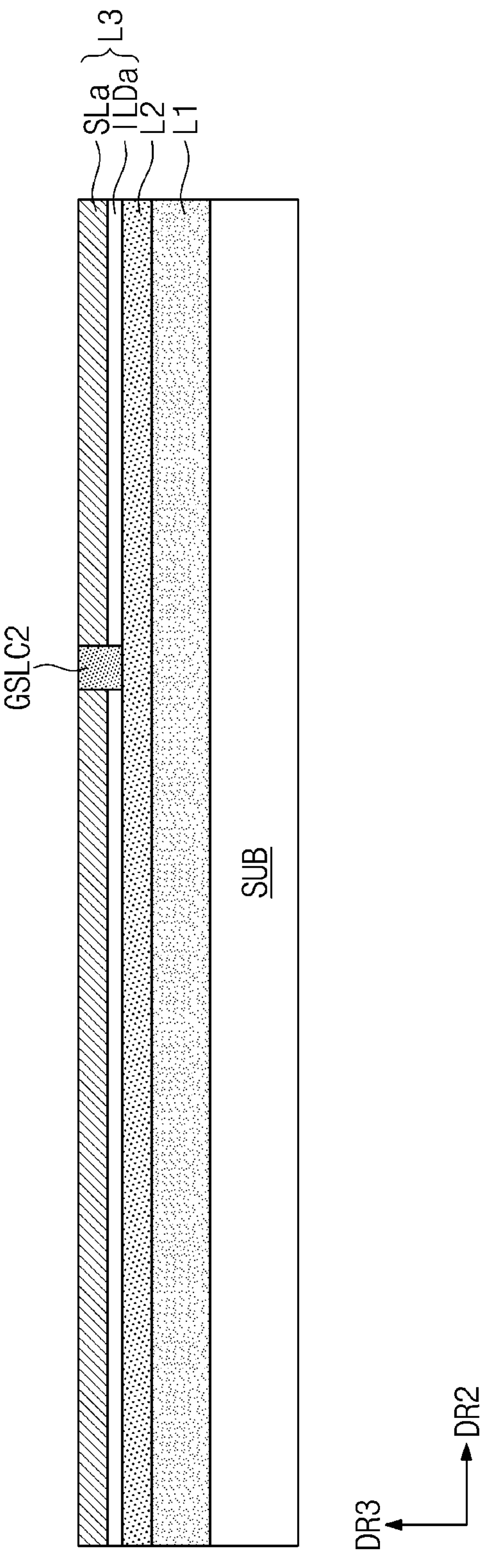
Figure 7C:
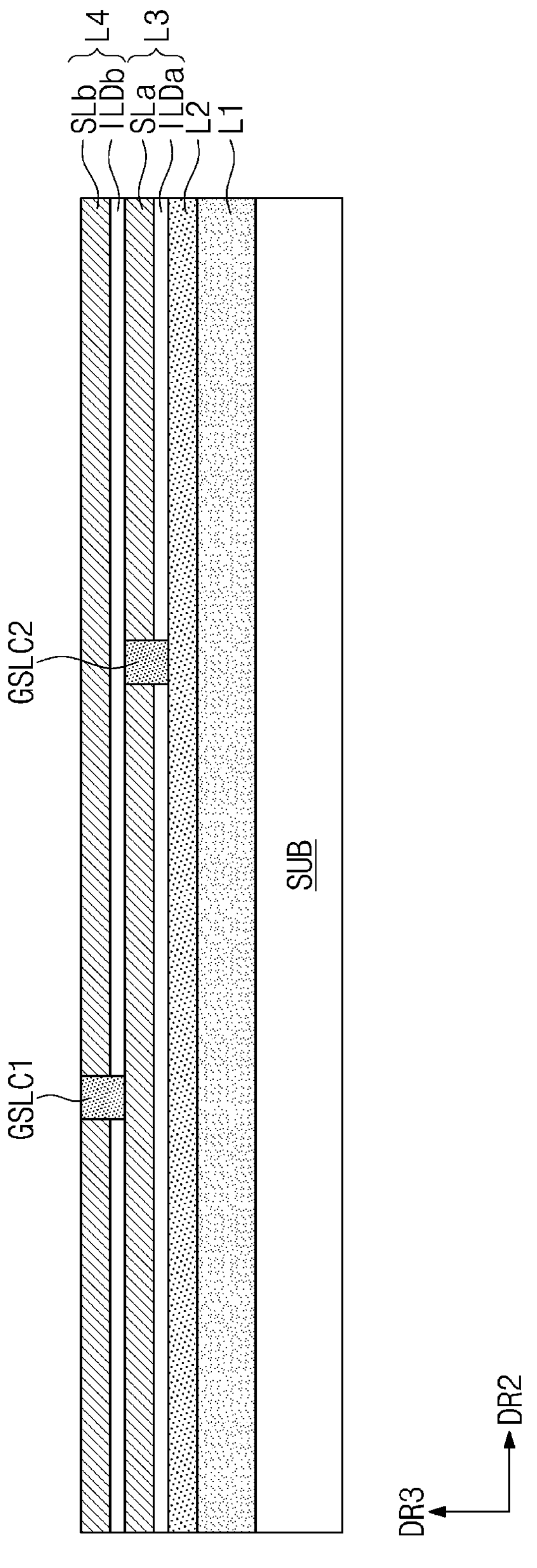
Figure 7D:
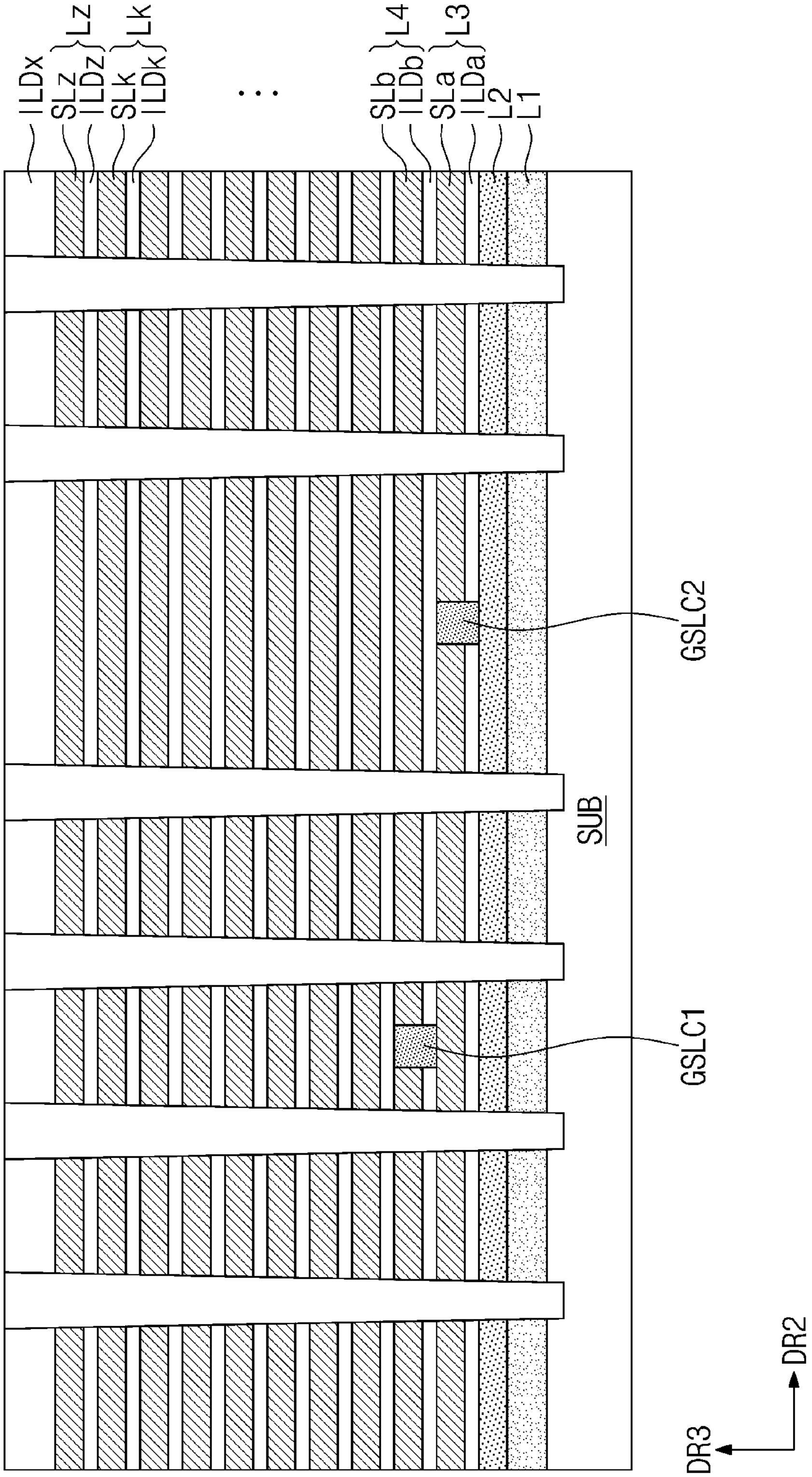
Figure 7E:
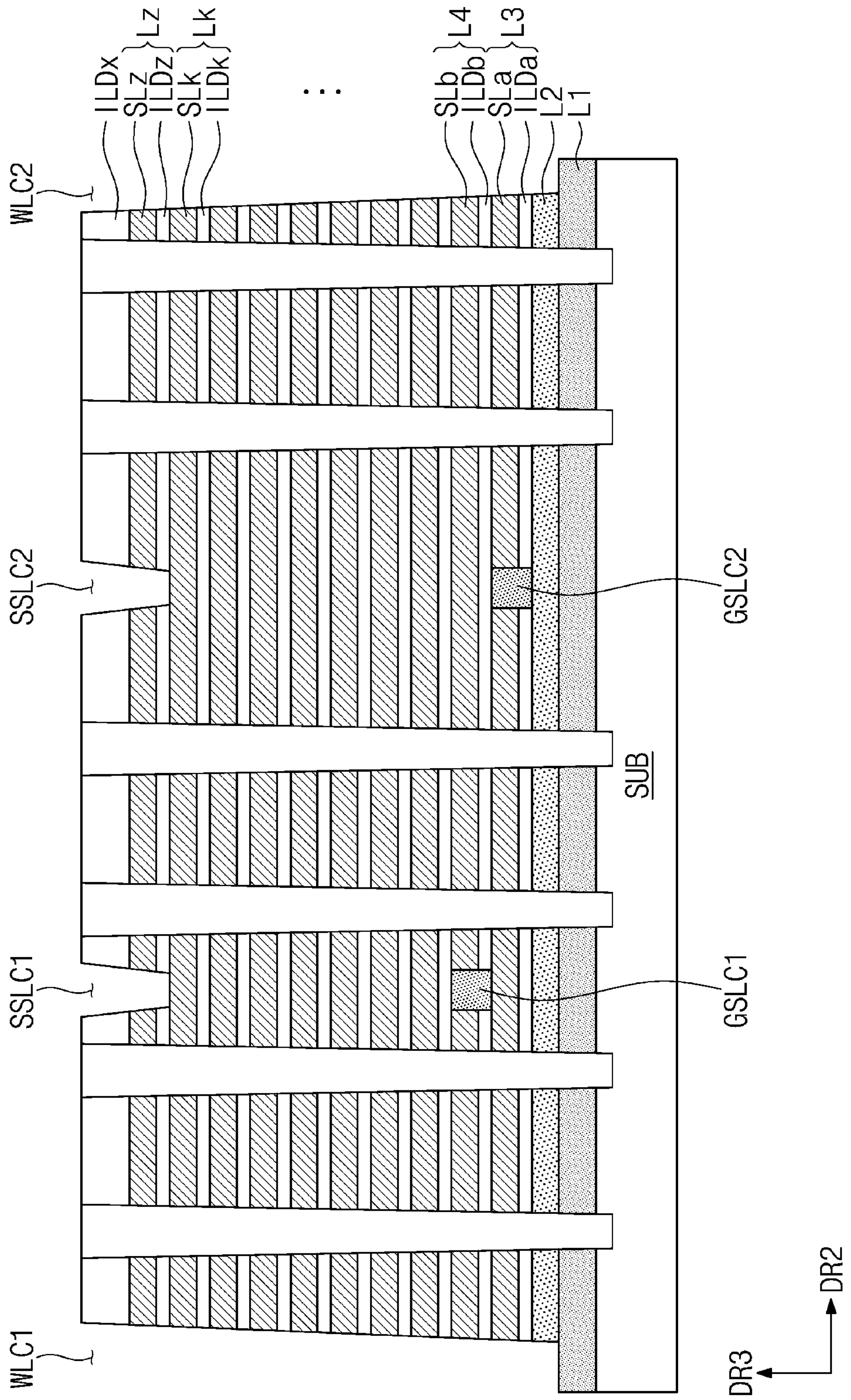

FIGS. 7A to 7E are cross-sectional views for describing a process of manufacturing a memory block of FIG. 6. Referring to FIGS. 6 to 7E, the substrate SUB may be provided on a plane defined by the first direction DR1 and the second direction DR2, and various materials or layers may be formed on the substrate SUB.

For example, as illustrated in FIG. 7A, on the substrate SUB, first to third layers L1 to L3 may be sequentially stacked or formed in the third direction DR3. The first layer L1 that is a lower sacrificial film may be formed of a silicon nitride material. In an embodiment, the first layer L1 may be formed by sequentially stacking a plurality of insulating films. The second layer L2 that is a lower semiconductor film may be formed of the same material as the substrate SUB. The third layer L3 may include an a-th interlayer insulating film ILDa and an a-th sacrificial film sLa. In an embodiment, a sacrificial film may be replaced with a conductive material through a subsequent process (e.g., the word line replacement process WL_REP), and thus, various lines may be formed. In an embodiment, the lines formed through the third layer L3 may include the lower ground selection lines GSLda and GSLdb described above.

Next, as illustrated in FIG. 7B, the second ground selection line separation structure GSLC2 may be formed in a partial region of the third layer L3. For example, as described above, the second ground selection line separation structure GSLC2 may be a structure for separating the lower ground selection lines GSLda and GSLdb formed in the third layer L3. In an embodiment, the second ground selection line separation structure GSLC2 may be spaced from the word line cuts WLC1 and WLC2 to be described later, in the second direction DR2. In an embodiment, the second ground selection line separation structure GSLC2 may overlap the second string selection line separation structure SSLC2 to be described later, when viewed from above a plane parallel to the substrate SUB. In an embodiment, the second ground selection line separation structure GSLC2 may include or be formed of an insulating material such as a silicon oxide material, a silicon nitride material, or a silicon oxynitride material.

Then, as illustrated in FIG. 7C, a fourth layer L4 may be formed on the third layer L3. The fourth layer L4 may include a b-th interlayer insulating film ILDb and a b-th sacrificial film SLb. In an embodiment, a sacrificial film may be replaced with a conductive material through a subsequent process (e.g., the word line replacement process WL_REP), and thus, various lines may be formed. In an embodiment, the lines formed through the fourth layer L4 may include the upper ground selection lines GSLua and GSLub described above.

The first ground selection line separation structure GSLC1 may be formed in a partial region of the fourth layer L4. For example, as described above, the first ground selection line separation structure GSLC1 may be a structure for separating the upper ground selection lines GSLua and GSLub formed in the fourth layer L4. In an embodiment, the first ground selection line separation structure GSLC1 may be spaced from the word line cuts WLC1 and WLC2 to be described later, in the second direction DR2. In an embodiment, the first ground selection line separation structure GSLC1 may overlap the first string selection line separation structure SSLC1 to be described later, when viewed from above a plane parallel to the substrate SUB. In an embodiment, the first ground selection line separation structure GSLC1 may include or be formed of an insulating material such as a silicon oxide material, a silicon nitride material, or a silicon oxynitride material.

Then, as illustrated in FIG. 7D, a plurality of layers ~Lk and Lz may be sequentially stacked or formed on the fourth layer L4. As in the above description, the plurality of layers ~Lk and Lz may include interlayer insulating films ~IDLk and IDLz and sacrificial films ~SLk and SLz. An x-th insulating film IDLx may be formed on the z-th layer Lz. Afterwards, the plurality of channel holes CH may be formed to penetrate the plurality of layers ~Lk and Lz. In an embodiment, a lower surface of each of the plurality of channel holes CH may be lower than an upper surface of the substrate SUB. For example, the plurality of channel holes CH may be formed to penetrate a portion of the substrate SUB.

Then, referring to FIG. 7E, the first and second word line cuts WLC1 and WLC2 may be formed on opposite sides of the memory block structure. The first and second word line cuts WLC1 and WLC2 may be spaced apart from each other in the second direction DR2, and the plurality of channel holes CH may be placed between the first and second word line cuts WLC1 and WLC2. The first and second word line cuts WLC1 and WLC2 may also be described as word line separation structures, word line separation holes, word line separation regions, or word line replacement wells, for example. The first and second word line cuts WLC1 and WLC2 may additionally be described as word line cut regions. In an embodiment, the first and second string selection line separation structures SSLC1 and SSLC2 for separating the a-th to c-th string selection lines SSLa, SSLb, and SSLc may be formed.

The word line replacement process WL_REP may be performed through the first and second word line cuts WLC1 and WLC2, and the sacrificial films sLa to SLz of the respective layers may be replaced with a conductive material through the word line replacement process WL_REP. In this case, the conductive material of the fourth layer L4 may be separated into conductive materials by the first ground selection line separation structure GSLC1, and thus, the upper ground selection lines GSLua and GSLub separated from each other may be formed. The conductive material of the third layer L3 may be separated into conductive materials by the second ground selection line separation structure GSLC2, and thus, the lower ground selection lines GSLda and GSLdb separated from each other may be formed. Subsequently, the conductive material formed in the word line cuts regions WLC1 and WLC2 when forming the word lines may be removed and replaced with an insulating material, for example, to electrically separate word lines from each other.

Figure 8A:
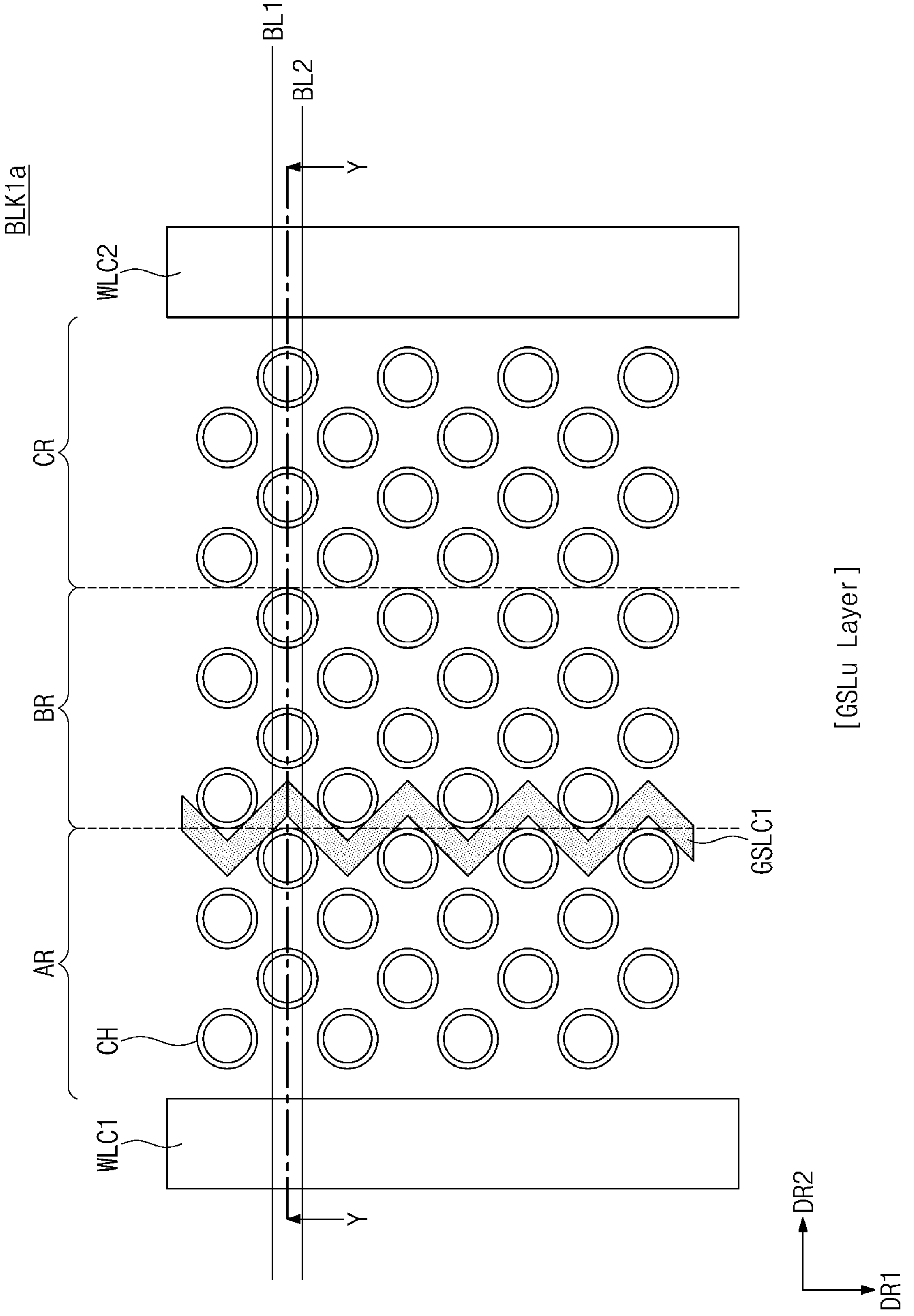
FIGS. 8A and 8B are plan views illustrating layers in which an upper ground selection line and a lower ground selection line of FIG. 4 are formed.
Figure 8B:
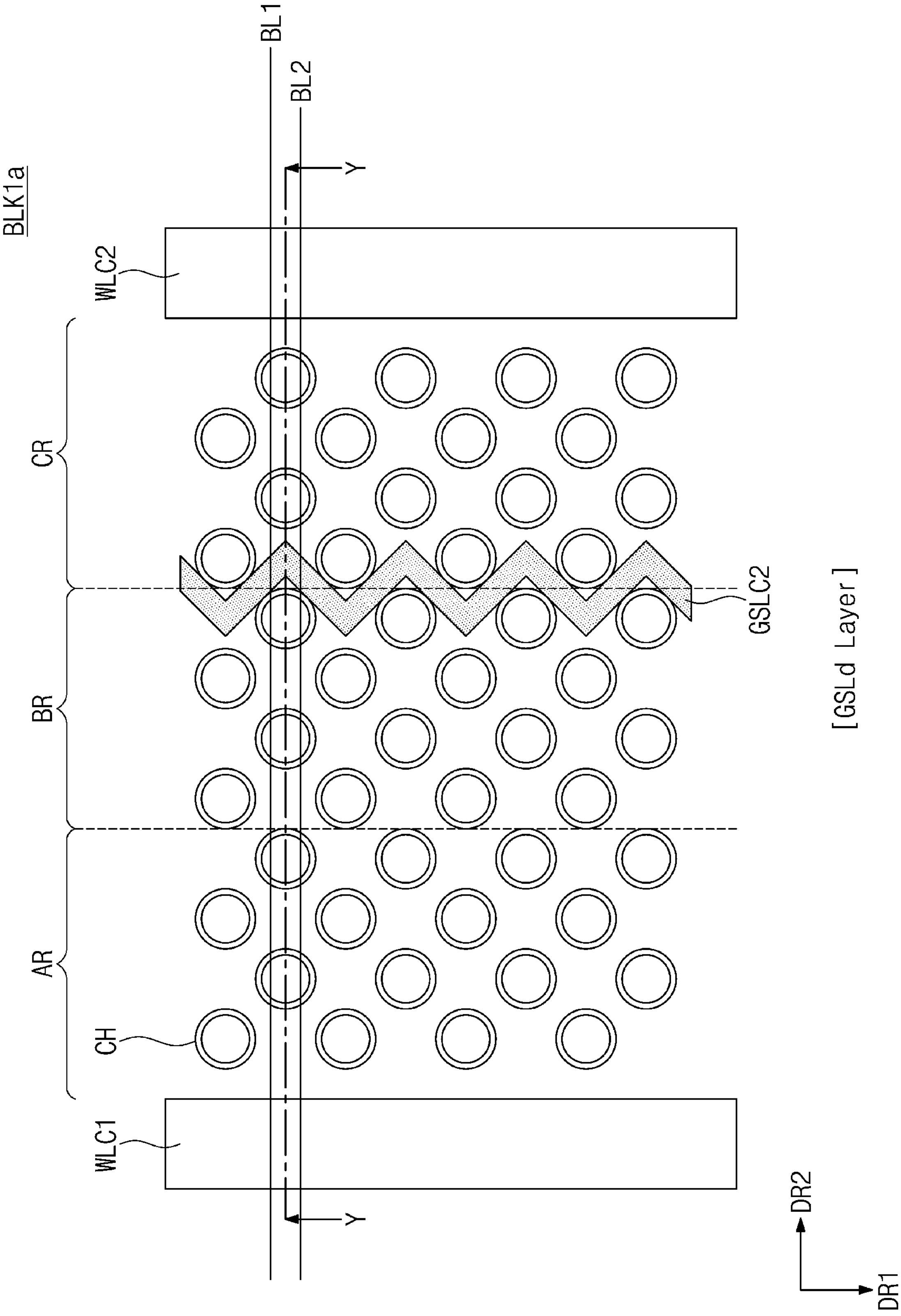

FIGS. 8A and 8B are plan views illustrating layers in which an upper ground selection line and a lower ground selection line of FIG. 4 are formed, according to one embodiment. For convenience of description, additional description associated with the components described above will be omitted to avoid redundancy.

In an embodiment, the first memory block BLK1 described above includes the dummy holes DH, and the ground selection line separation structures GSLC1 and GSLC2 for separating ground selection lines are formed in a region in which the ground selection line separation structures GSLC1 and GSLC2 overlap the dummy holes DH. However, the present disclosure is not limited thereto.

Referring to FIGS. 8A and 8B, a first memory block BLKla may include the plurality of channel holes CH formed between the first word line cut WLC1 and the second word line cut WLC2. In the same layer between the first and second word line cuts WLC1 and WLC2, the first and second ground selection line separation structures GSLC1 and GSLC2 for separating ground selection lines may be formed in a region in which the first and second ground selection line separation structures GSLC1 and GSLC2 do not overlap the channel holes CH.

For example, as illustrated in FIGS. 8A and 8B, a region between the first and second word line cuts WLC1 and WLC2 may be divided into the A-th region AR, the B-th region BR, and the C-th region CR. The channel holes CH included in the A-th region AR may be connected with the a-th string selection line SSLa, the channel holes CH included in the B-th region BR may be connected with the b-th string selection line SSLb, and the channel holes CH included in the C-th region CR may be connected with the c-th string selection line SSLc.

As illustrated in FIG. 8A, the first ground selection line separation structure GSLC1 may be formed in a layer in which the upper ground selection line GSLu is formed. The first ground selection line separation structure GSLC1 may be formed between the A-th region AR and the B-th region BR. In this case, unlike the structure of FIG. 5A, in the structure of FIG. 8A, the first ground selection line separation structure GSLC1 may extend in the first direction DR1 and may be formed in the shape of an embossed line (e.g., a line having a zig zag shape, or wave shape) so as not to overlap the channel holes CH.

As illustrated in FIG. 8B, the second ground selection line separation structure GSLC2 may be formed in a layer in which the lower ground selection line GSLd is formed. The second ground selection line separation structure GSLC2 may be formed between the B-th region BR and the C-th region CR. In this case, unlike the structure of FIG. 5B, in the structure of FIG. 8B, the second ground selection line separation structure GSLC2 may extend in the first direction DR1 and may be formed in the shape of an embossed line (e.g., a line having a zig zag shape, or wave shape) so as not to overlap the channel holes CH. According to the above description, the first and second ground selection line separation structures GSLC1 and GSLC2 may be formed without separate dummy holes, and therefore additional cell strings can be used instead of dummy holes.

Figure 9:
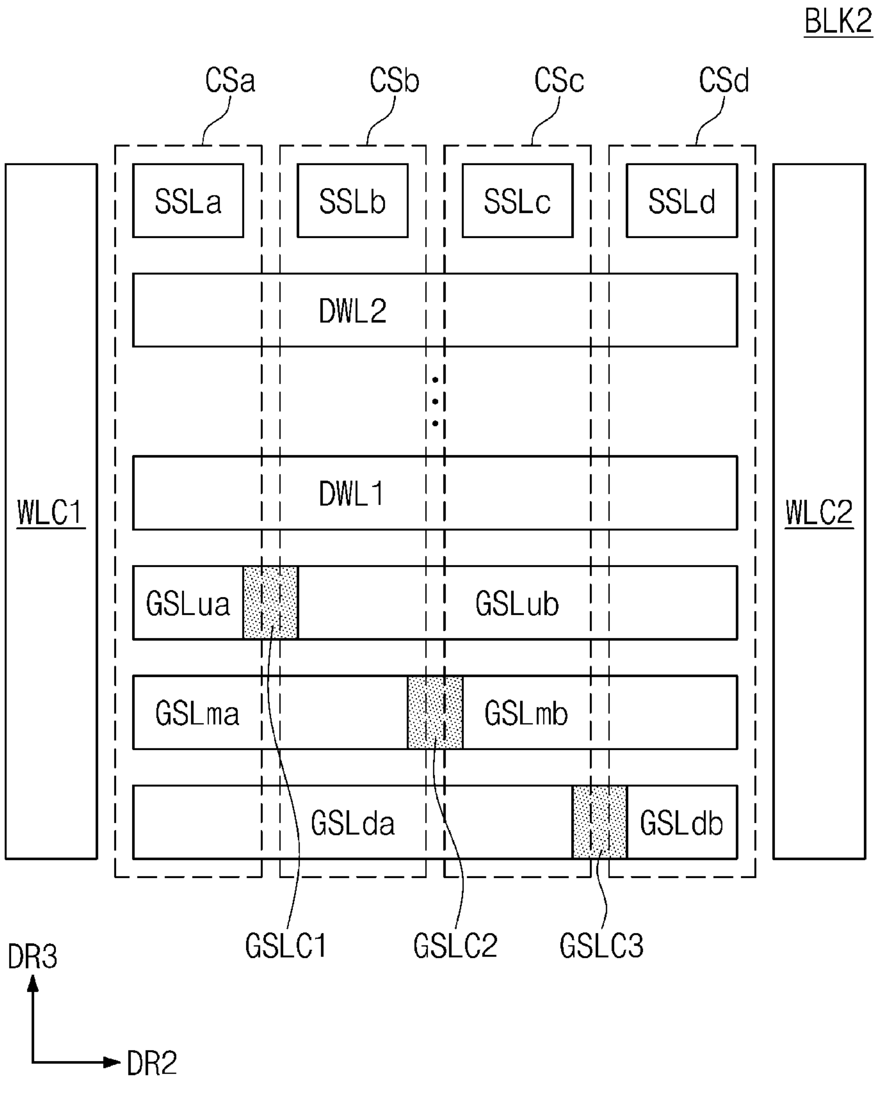
FIG. 9 is a diagram for describing a memory block included in a memory cell array of FIG. 1.

FIG. 9 is a diagram for describing a memory block included in a memory cell array of FIG. 1. Below, to describe embodiments of the present disclosure easily, some of lines of a memory block or a partial structure of the memory block is conceptually illustrated.

Referring to FIG. 9, a second memory block BLK2 may include 4 cell strings cSa, CSb, CSc, and CSd. In an embodiment, the 4 cell strings cSa, CSb, CSc, and CSd may be formed between the first word line cut WLC1 and the second word line cut WLC2 and may be connected with one bit line (e.g., BL1).

The 4 cell strings cSa, CSb, CSc, and CSd may be respectively connected to 4 string selection lines SSLa, SSLb, SSLc, and SSLd. The 4 cell strings cSa, CSb, CSc, and CSd may be connected to word lines DWL1, DWL2, WL, etc. formed between the first word line cut WLC1 and the second word line cut WLC2.

The 4 cell strings cSa, CSb, CSc, and CSd may be connected to a plurality of ground selection lines GSLua, GSLub, GSLma, GSLmb, GSLda, and GSLdb. For example, the a-th cell string cSa may be connected to the a-th upper ground selection line GSLua, the a-th middle ground selection line GSLma, and the a-th lower ground selection line GSLda. The b-th cell string CSb may be connected to the b-th upper ground selection line GSLub, the a-th middle ground selection line GSLma, and the a-th lower ground selection line GSLda. The c-th cell string CSc may be connected to the b-th upper ground selection line GSLub, the b-th middle ground selection line GSLmb, and the a-th lower ground selection line GSLda. The d-th cell string CSd may be connected to the b-th upper ground selection line GSLub, the b-th middle ground selection line GSLmb, and the b-th lower ground selection line GSLdb.

For example, the a-th upper ground selection line GSLua may be connected to the a-th cell string cSa, and the b-th upper ground selection line GSLub may be connected to the b-th, c-th, and d-th cell strings CSb, CSc, and CSd. The a-th middle ground selection line GSLma may be connected to the a-th and b-th cell strings cSa and CSb, and the b-th middle ground selection line GSLmb may be connected to the c-th and d-th cell strings CSc, and CSd. The a-th lower ground selection line GSLda may be connected to the a-th, b-th, and c-th cell strings cSa, CSb, and CSc, and the b-th lower ground selection line GSLdb may be connected to the d-th cell string CSd.

To implement the above ground selection lines GSLua, GSLub, GSLma, GSLmb, GSLda, and GSLdb, first to third ground selection line separation structures GSLC1, GSLC2, and GSLC3 may be formed between the first word line cut WLC1 and the second word line cut WLC2. The first ground selection line separation structure GSLC1 may be placed in a layer where the upper ground selection lines GSLua and GSLub are formed and may be formed between the a-th cell string cSa and the b-th cell string CSb; the second ground selection line separation structure GSLC2 may be placed in a layer where the middle ground selection lines GSLma and GSLmb are formed and may be formed between the b-th cell string CSb and the c-th cell string CSc; the third ground selection line separation structure GSLC3 may be placed in a layer where the lower ground selection lines GSLda and GSLdb are formed and may be formed between the c-th cell string CSc and the d-th cell string CSd. In an embodiment, as in the above description, the first to third ground selection line separation structures GSLC1, GSLC2, and GSLC3 may not overlap each other, when viewed from above a plane parallel to the substrate. The connection of the cell strings Csa, CSb, CSc, and CSd with the common source line CSL may be independently controlled, for example by independent ground select signal lines that are electrically isolated from each other or can be switchably electrically separated from each other, through the above structure.

Figure 10:
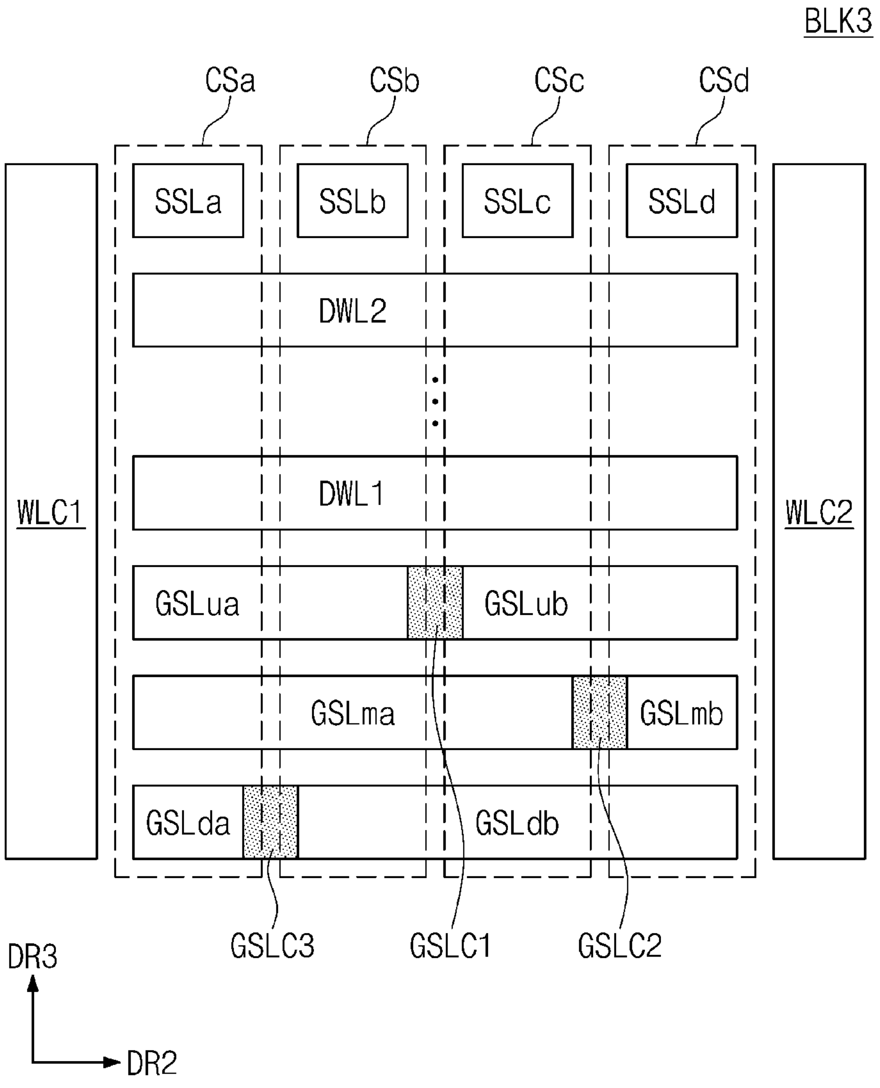
FIG. 10 is a diagram for describing a memory block included in a memory cell array of FIG. 1.

FIG. 10 is a diagram for describing a memory block included in a memory cell array of FIG. 1. Below, to describe embodiments of the present disclosure easily, some of lines of a memory block or a partial structure of the memory block is conceptually illustrated.

Referring to FIG. 10, a third memory block BLK3 may include the 4 cell strings cSa, CSb, CSc, and CSd. The 4 cell strings cSa, CSb, CSc, and CSd may be formed between the first word line cut WLC1 and the second word line cut WLC2 and may be connected with various lines SSLa, SSLb, SSLc, SSLd, DWL1, and DWL2. This is similar to that described above, and thus, additional description will be omitted to avoid redundancy.

The 4 cell strings cSa, CSb, CSc, and CSd may be connected to a plurality of ground selection lines GSLua, GSLub, GSLma, GSLmb, GSLda, and GSLdb. For example, the a-th cell string cSa may be connected to the a-th upper ground selection line GSLua, the a-th middle ground selection line GSLma, and the a-th lower ground selection line GSLda. The b-th cell string CSb may be connected to the a-th upper ground selection line GSLua, the a-th middle ground selection line GSLma, and the b-th lower ground selection line GSLdb. The c-th cell string CSc may be connected to the b-th upper ground selection line GSLub, the a-th middle ground selection line GSLma, and the b-th lower ground selection line GSLdb. The d-th cell string CSd may be connected to the b-th upper ground selection line GSLub, the b-th middle ground selection line GSLmb, and the b-th lower ground selection line GSLdb.

For example, the a-th upper ground selection line GSLua may be connected to the a-th and b-th cell strings cSa and CSb, and the b-th upper ground selection line GSLub may be connected to the c-th and d-th cell strings CSc and CSd. The a-th middle ground selection line GSLma may be connected to the a-th, b-th, and c-th cell strings cSa, CSb, and CSc, and the b-th middle ground selection line GSLmb may be connected to the d-th cell string CSd. The a-th lower ground selection line GSLda may be connected to the a-th cell string cSa, and the b-th lower ground selection line GSLdb may be connected to the b-th, c-th, and d-th cell strings CSb, CSc, and CSd.

Figure 11:
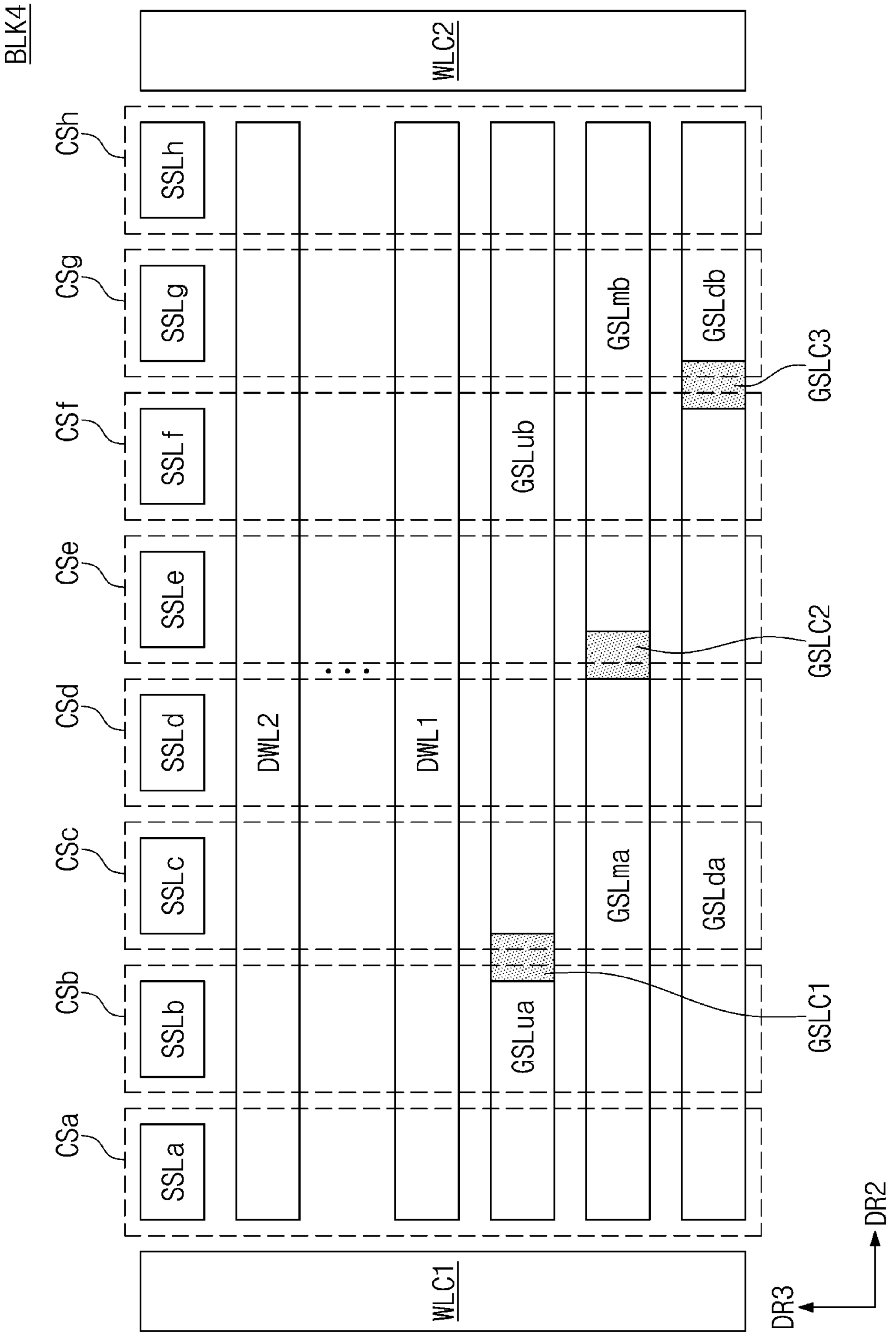
FIG. 11 is a diagram for describing a memory block included in a memory cell array of FIG. 1.

FIG. 11 is a diagram for describing a memory block included in a memory cell array of FIG. 1. Below, to describe embodiments of the present disclosure easily, some of lines of a memory block or a partial structure of the memory block is conceptually illustrated.

Referring to FIG. 11, a fourth memory block BLK4 may include 8 cell strings cSa, CSb, CSc, CSd, cSe, CSf, CSg, and CSh. The 8 cell strings cSa, CSb, CSc, CSd, cSe, CSf, CSg, and CSh may be formed between the first word line cut WLC1 and the second word line cut WLC2. The 8 cell strings cSa, CSb, CSc, CSd, cSe, CSf, CSg, and CSh may be respectively connected to 8 string selection lines SSLa, SSLb, SSLc, SSLd, SSLe, SSLf, SSLg, and SSLh. The 8 cell strings cSa, CSb, CSc, CSd, cSe, CSf, CSg, and CSh may be connected to word lines DWL1, DWL2, WL, etc. formed between the first word line cut WLC1 and the second word line cut WLC2.

The 8 cell strings cSa, CSb, CSc, CSd, cSe, CSf, CSg, and CSh may be connected to the plurality of ground selection lines GSLua, GSLub, GSLma, GSLmb, GSLda, and GSLdb. For example, the a-th and b-th cell strings cSa and CSb may be connected to the a-th upper ground selection line GSLua, the a-th middle ground selection line GSLma, and the a-th lower ground selection line GSLda. The c-th and d-th cell strings CSc and CSd may be connected to the b-th upper ground selection line GSLub, the a-th middle ground selection line GSLma, and the a-th lower ground selection line GSLda. The e-th and f-th cell strings cSe and CSf may be connected to the b-th upper ground selection line GSLub, the b-th middle ground selection line GSLmb, and the a-th lower ground selection line GSLda. The g-th and h-th cell strings CSg and CSh may be connected to the b-th upper ground selection line GSLub, the b-th middle ground selection line GSLmb, and the b-th lower ground selection line GSLdb.

To implement the above ground selection line structure of the fourth memory block BLK4 of FIG. 11, the first to third ground selection line separation structures GSLC1, GSLC2, and GSLC3 may be formed between the first word line cut WLC1 and the second word line cut WLC2. The first ground selection line separation structure GSLC1 may be placed in a layer where the upper ground selection lines GSLua and GSLub are formed and may be formed between the b-th cell string CSb and the c-th cell string CSc. The second ground selection line separation structure GSLC2 may be placed in a layer where the middle ground selection lines GSLma and GSLmb are formed and may be formed between the d-th cell string CSd and the e-th cell string cSe. The third ground selection line separation structure GSLC3 may be placed in a layer where the lower ground selection lines GSLda and GSLdb are formed and may be formed between the f-th cell string CSf and the g-th cell string CSg.

As described with reference to FIGS. 9 to 11, the number of layers in which ground selection lines are formed and the arrangement way may be determined depending on the number of cell strings between word line cuts and the minimum number of cell strings connected with one ground selection line. For example, it is assumed that the number of cell strings placed between word line cuts from among cell strings connected with the same bit line is "a" and the minimum number of cell strings connected with one ground selection line from among the cell strings connected with the same bit line is "3".

In this case, the number of layers necessary (e.g., minimum number of layers used) to form ground selection lines may be "$(\alpha/\beta)-1$". For example, in the structure of FIG. 9 or 10, that is, in the case where 4 cell strings are formed between the first and second word line cuts WLC1 and WLC2 and the minimum number of cell strings connected with one ground selection line is "1", the number of layers necessary (e.g., minimum number of layers used) to form ground selection lines (i.e., the number of ground selection lines formed at different heights from the substrate) may be 3 $(=(4/1)-1)$. Alternatively, in the structure of FIG. 11, that is, in the case where 8 cell strings are formed between the first and second word line cuts WLC1 and WLC2 and the minimum number of cell strings connected with one ground selection line is "2", the number of layers necessary (e.g., minimum number of layers used) to form ground selection lines (i.e., the number of ground selection lines formed at different heights from the substrate) may be 3 $(=(8/2)-1)$.

As described above, ground selection lines of the asymmetric structure may be formed in various manners depending on the number of cell strings. Also, as described above, ground selection lines between two adjacent word line cuts may be physically separated by ground selection line separation structures, and at different vertical levels, different ground selections lines may be physically separated by these ground selection line separation structures at different locations from a plan view, in an asymmetric manner.

Figure 12A:
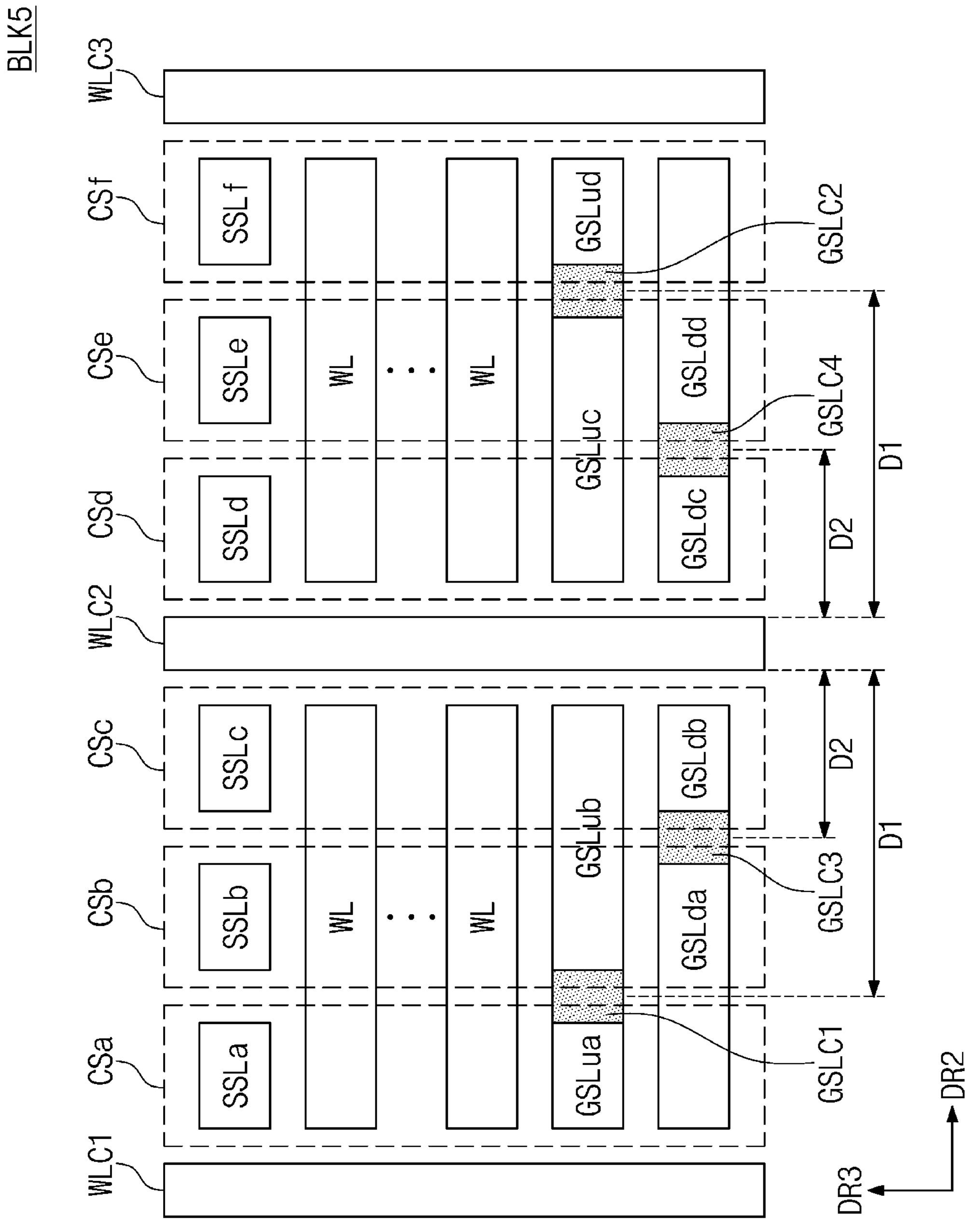
FIGS. 12A to 12C are diagrams for describing a memory block included in a memory cell array of FIG. 1.
Figure 12B:
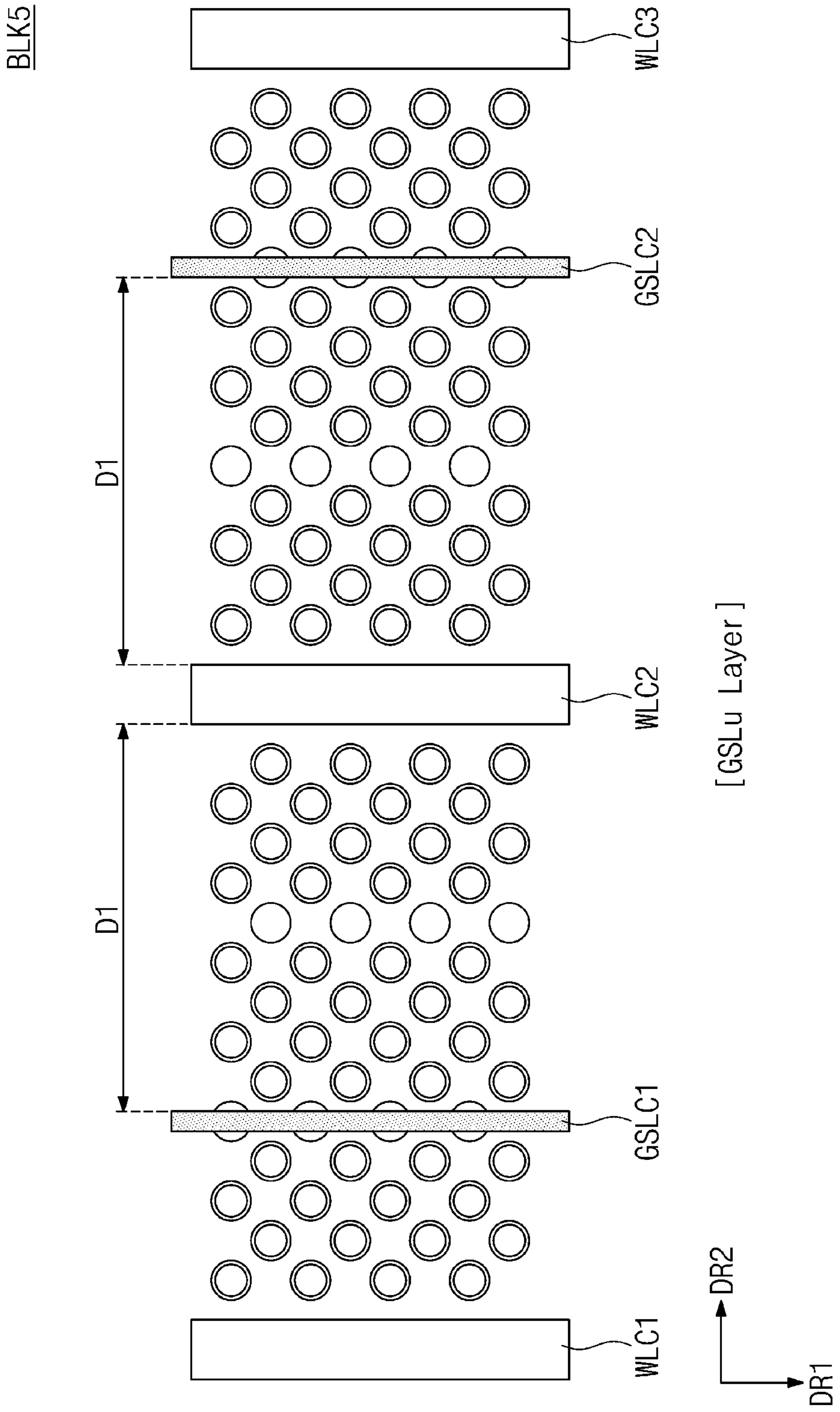
Figure 12C:
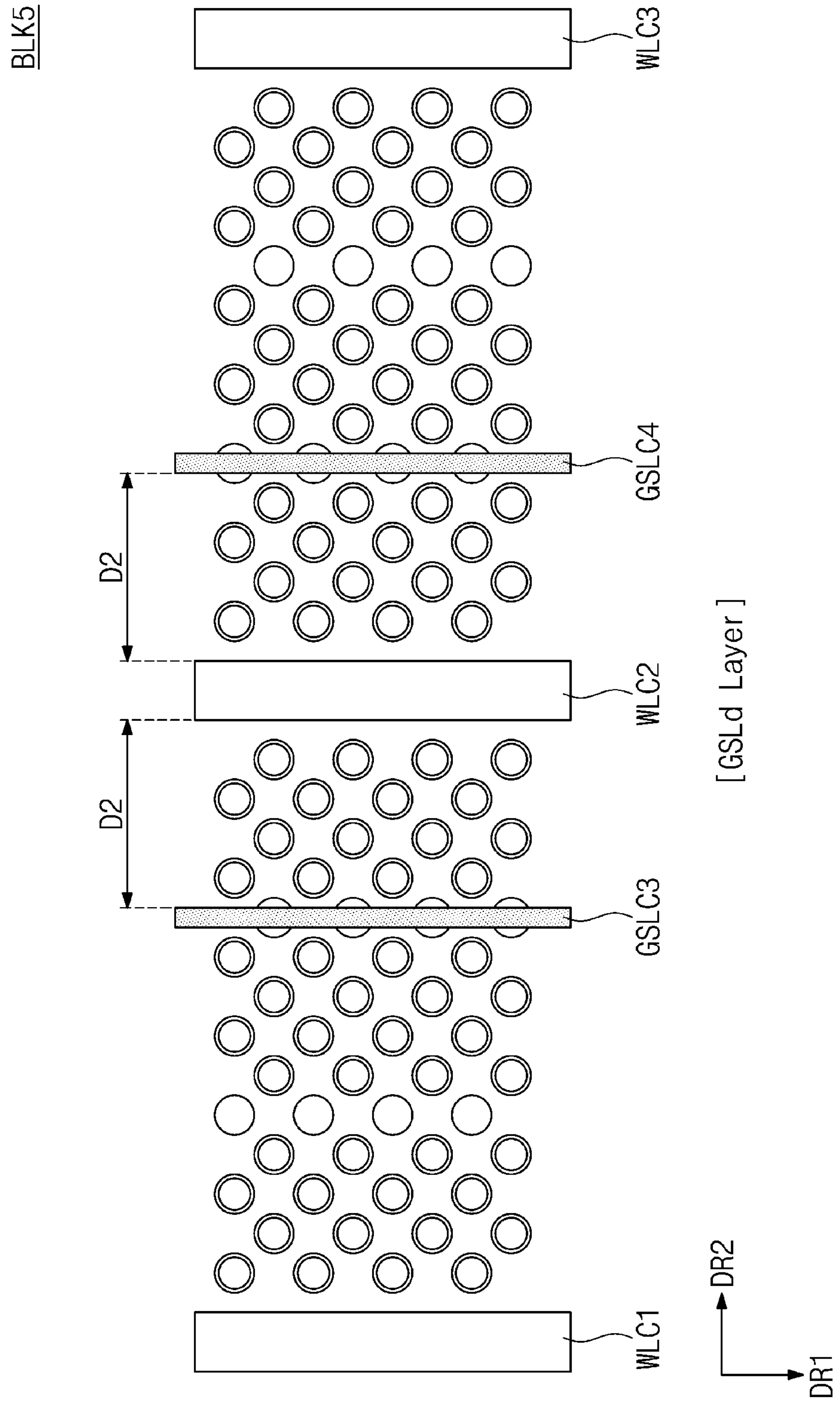

FIGS. 12A to 12C are diagrams for describing a memory block included in a memory cell array of FIG. 1. Below, to describe embodiments of the present disclosure easily, some of lines of a memory block or a partial structure of the memory block is conceptually illustrated.

Referring to FIG. 12A, a fifth memory block BLK5 may include a plurality of cell strings cSa, CSb, CSc, CSd, cSe, and CSf. In an embodiment, the plurality of cell strings cSa, CSb, CSc, CSd, cSe, and CSf may be connected to the same bit line.

The a-th to c-th cell strings cSa, CSb, and CSc may be formed between the first and second word line cuts WLC1 and WLC2, and the d-th to f-th cell strings CSd, cSe, and CSf may be formed between the second and third word line cuts WLC2 and WLC3. The plurality of cell strings cSa, CSb, CSc, CSd, cSe, and CSf may be respectively connected to a plurality of string selection lines SSLa, SSLb, SSLc, SSLd, SSLe, and SSLf.

In an embodiment, a-th and b-th upper ground selection lines GSLua and GSLub may be formed between the first and second word line cuts WLC1 and WLC2, and c-th and d-th upper ground selection lines GSLuc and GSLud may be formed between the second and third word line cuts WLC2 and WLC3. The a-th upper ground selection line GSLua may be connected to the a-th cell string cSa, the b-th upper ground selection line GSLub may be connected to the b-th and c-th cell strings CSb and CSc, the c-th upper ground selection line GSLuc may be connected to the d-th and e-th cell strings CSd and cSe, and the d-th upper ground selection line GSLud may be connected to the f-th cell string CSf.

In an embodiment, the a-th, b-th, c-th, and d-th upper ground selection lines GSLua, GSLub, GSLuc, and GSLud may be formed at the same height from the substrate. In an embodiment, a first ground selection line separation structure GSLC1 for separating the a-th and b-th upper ground selection lines GSLua and GSLub may be formed between the first and second word line cuts WLC1 and WLC2, and a second ground selection line separation structure GSLC2 for separating the c-th and d-th upper ground selection lines GSLuc and GSLud may be formed between the second and third word line cuts WLC2 and WLC3.

In an embodiment, a-th and b-th lower ground selection lines GSLda and GSLdb may be formed between the first and second word line cuts WLC1 and WLC2, and c-th and d-th lower ground selection lines GSLdc and GSLdd may be formed between the second and third word line cuts WLC2 and WLC3. The a-th lower ground selection line GSLda may be connected with the a-th and b-th cell strings cSa and CSb, the b-th lower ground selection line GSLdb may be connected with the c-th cell string CSc, the c-th lower ground selection line GSLdc may be connected with the d-th cell string CSd, and the d-th lower ground selection line GSLdd may be connected with the e-th and f-th cell strings cSe and CSf.

In an embodiment, the a-th, b-th, c-th, and d-th lower ground selection lines GSLda, GSLdb, GSLdc, and GSLdd may be formed at the same height from the substrate. In an embodiment, a third ground selection line separation structure GSLC3 for separating the a-th and b-th lower ground selection lines GSLda and GSLdb may be formed between the first and second word line cuts WLC1 and WLC2, and a fourth ground selection line separation structure GSLC4 for separating the c-th and d-th lower ground selection lines GSLdc and GSLdd may be formed between the second and third word line cuts WLC2 and WLC3.

For example, each of the first and second ground selection line separation structures GSLC1 and GSLC2 placed at the same height from the substrate may be spaced from the second word line cut WLC2 as much as a first distance D1, and each of the third and fourth ground selection line separation structures GSLC3 and GSLC4 placed at the same height from the substrate may be spaced from the second word line cut WLC2 as much as a second distance D2 different from the first distance D1.

For example, as illustrated in FIG. 12B, the first ground selection line separation structure GSLC1 may be placed in the layer where the upper ground selection lines GSLu are formed and may be formed between the first and second word line cuts WLC1 and WLC2, and the second ground selection line separation structure GSLC2 may be placed in the layer where the upper ground selection lines GSLu are formed and may be formed between the second and third word line cuts WLC2 and WLC3. The first ground selection line separation structure GSLC1 may be spaced from the second word line cut WLC2 as much as the first distance D1 in the second direction DR2, and the second ground selection line separation structure GSLC2, arranged at an opposite side of the second word line cut WLC2 as the first ground selection line separation structure GSLC1, may be spaced from the second word line cut WLC2 as much as the first distance D1 in the second direction DR2.

Next, as illustrated in FIG. 12C, the third ground selection line separation structure GSLC3 may be placed in the layer where the lower ground selection lines GSLd are formed and may be formed between the first and second word line cuts WLC1 and WLC2, and the fourth ground selection line separation structure GSLC4 may be placed in the layer where the lower ground selection lines GSLd are formed and may be formed between the second and third word line cuts WLC2 and WLC3. The third ground selection line separation structure GSLC3 may be spaced from the second word line cut WLC2 as much as the second distance D2 in the second direction DR2, and the fourth ground selection line separation structure GSLC4 may be spaced from the second word line cut WLC2 as much as the second distance D2 in the second direction DR2.

As described above, the ground selection lines GSLua, GSLub, GSLda, and GSLdb connected with the cell strings cSa, CSb, and CSc between the first and second word line cuts WLC1 and WLC2 and the ground selection lines GSLuc, GSLud, GSLdc, and GSLdd connected with the cell strings CSd, cSe, and CSf between the second and third word line cuts WLC2 and WLC3 may be mirror symmetric with respect to the second word line cut WLC2. For example, ground selection lines connected to or adjacent to the same word line cut from among ground selection lines placed at the same height from the substrate may have the same length in the second direction DR2. In this case, because a conductive material is filled as much as the same length in the second direction DR2 through the word line replacement process WL_REP performed through a word line cut, the ground selection lines may be formed more easily or accurately.

Figure 13:
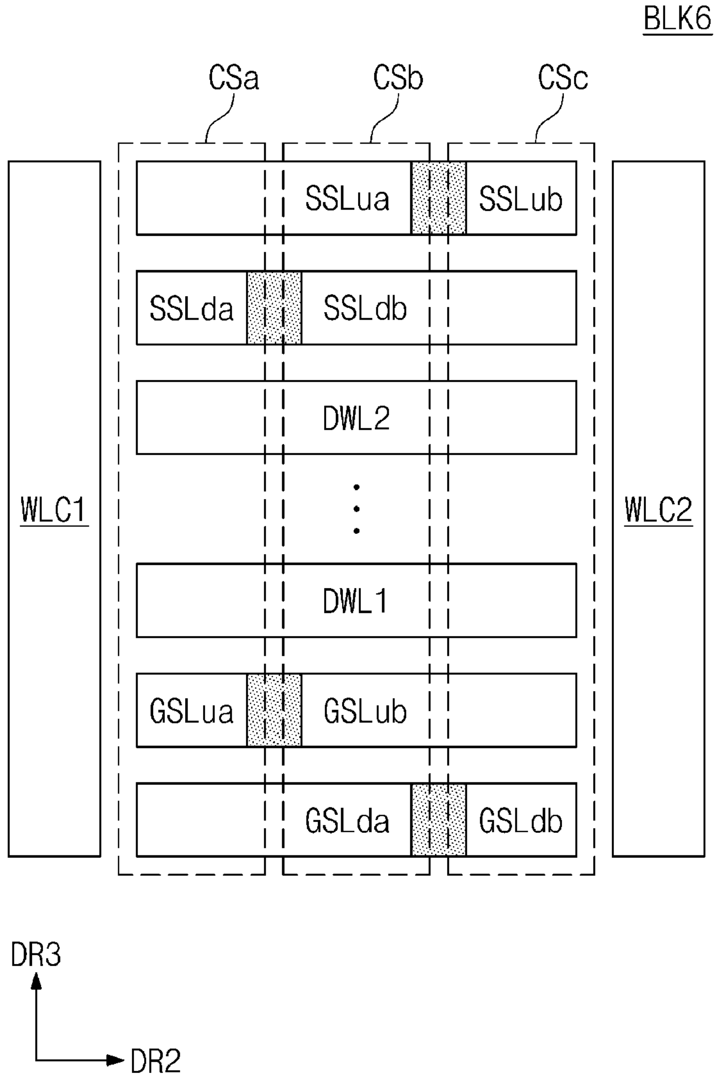
FIG. 13 is a diagram for describing a memory block included in a memory cell array of FIG. 1.

FIG. 13 is a diagram for describing a memory block included in a memory cell array of FIG. 1. Below, to describe embodiments of the present disclosure easily, some of lines of a memory block or a partial structure of the memory block is conceptually illustrated.

Referring to FIG. 13, a sixth memory block BLK6 may include a plurality of cell strings cSa, CSb, and CSc. The plurality of cell strings cSa, CSb, and CSc may be formed between the first word line cut WLC1 and the second word line cut WLC2. The plurality of cell strings cSa, CSb, and CSc may be connected to the same bit line. The plurality of cell strings cSa, CSb, and CSc may be connected in common to various lines (e.g., DWL1, DWL2, and WL). The a-th cell string cSa may be connected to the a-th upper ground selection line GSLua and the a-th lower ground selection line GSLda, and the b-th cell string CSb may be connected to the b-th upper ground selection line GSLub and the a-th lower ground selection line GSLda. The c-th cell string CSc may be connected to the b-th upper ground selection line GSLub and the b-th lower ground selection line GSLdb. Accordingly, the ground selection lines GSLua, GSLub, GSLda, and GSLdb may have the asymmetric structure as described above.

In an embodiment, in addition to the ground selection lines GSLua, GSLub, GSLda, and GSLdb connected with the plurality of cell strings cSa, CSb, and CSc, string selection lines SSLua, SSLub, SSLda, and SSLdb connected with the plurality of cell strings cSa, CSb, and CSc may also have an asymmetric structure. For example, the a-th cell string cSa may be connected with the a-th upper string selection line SSLua and the a-th lower string selection line SSLda, the b-th cell string CSb may be connected with the a-th upper string selection line SSLua and the b-th lower string selection line SSLdb, and the c-th cell string CSc may be connected with the b-th upper string selection line SSLub and the b-th lower string selection line SSLdb. In other words, the a-th upper string selection line SSLua may be connected with the a-th and b-th cell strings cSa and CSb, and the b-th upper string selection line SSLub may be connected with the c-th cell string CSc. The a-th lower string selection line SSLda may be connected with the a-th cell string cSa, and the b-th lower string selection line SSLdb may be connected with the b-th and c-th cell strings CSb and CSc.

An upper string selection line separation structure for separating the a-th and b-th upper string selection lines SSLua and SSLub may be formed between the first and second word line cuts WLC1 and WLC2. A lower string selection line separation structure for separating the a-th and b-th lower string selection lines SSLda and SSLdb may be formed between the first and second word line cuts WLC1 and WLC2. In an embodiment, as in the ground selection line separation structures, the upper string selection line separation structure and the lower string selection line separation structure may not overlap each other when viewed from above a plane parallel to the substrate.

As described above, a memory device according to an embodiment of the present disclosure may include a memory block. The memory block may include a plurality of cell strings formed between word line cuts. The plurality of cell strings may be connected with a plurality of ground selection lines. In this case, the plurality of ground selection lines may be formed in an asymmetric structure. For example, from a plan view, each set of ground selection lines that are formed along a single line in a first direction may include two or more lines separated from each other by one or more ground selection line separation structures, and the two or more lines are not symmetric about a line formed between them and extending in a second direction. Also, two line sets arranged in adjacent rows arranged adjacent to each other in the second direction, each row extending in the first direction, may not be symmetric about a line formed between the adjacent rows and also extending in the first direction. As the plurality of ground selection lines are formed in the asymmetric structure, all the ground selection lines may be normally formed through the word line cuts by using the word line replacement process, and an independent operation of each cell string (e.g., the connection of each cell to with the common source line CSL) may be secured. Accordingly, a memory device capable of reducing manufacturing costs, improving the reliability of operation, and reducing power consumption may be provided.

Figure 14:
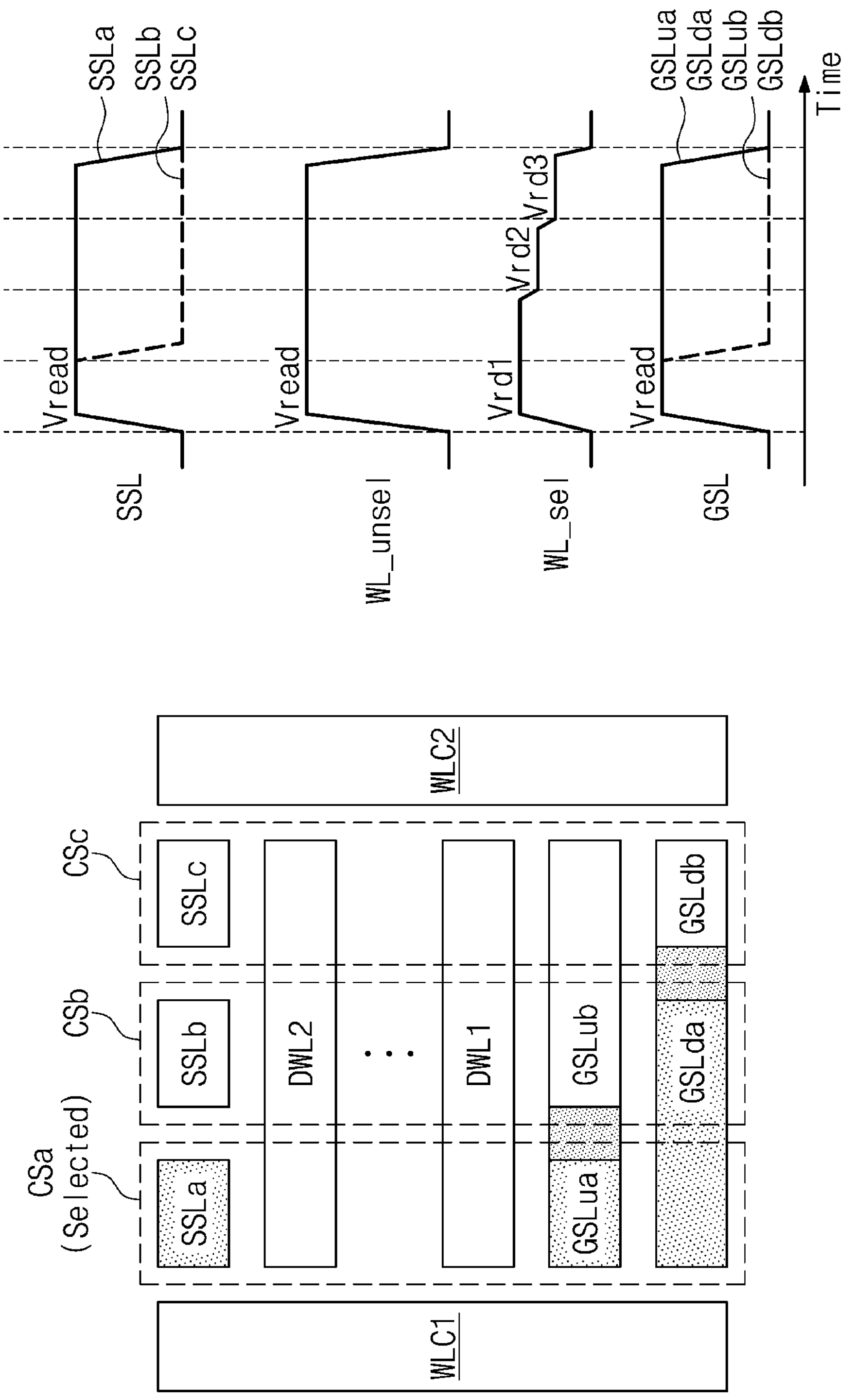
FIG. 14 is a diagram for describing an operation of a memory device of FIG. 1.

FIG. 14 is a diagram for describing an operation of a memory device of FIG. 1. For brevity of drawing and convenience of description, an operation of the memory device 100 will be described based on the first memory block BLK1, and thus, additional description associated with the components described above will be omitted to avoid redundancy.

Referring to FIGS. 1, 4, and 14, the first memory block BLK1 may include the plurality of cell strings cSa, CSb, and CSc formed between the first word line cut WLC1 and the second word line cut WLC2. The plurality of cell strings cSa, CSb, and CSc may be connected with various lines (e.g., SSLa, SSLb, SSLc, DWL1, DWL2, WL, GSLua, GSLub, GSLda, and GSLdb). A connection relationship between the plurality of cell strings cSa, CSb, and CSc and the lines (e.g., SSLa, SSLb, SSLc, DWL1, DWL2, WL, GSLua, GSLub, GSLda, and GSLdb) is described above, and thus, additional description will be omitted to avoid redundancy.

In an embodiment, the memory device 100 may perform a read operation on the first memory block BLK1. In the read operation, the memory device 100 may electrically connect a selected cell string with the common source line CSL for the purpose of determining a threshold voltage state of at least one of memory cells included in the selected cell string (i.e., reading data from at least one of the memory cells).

For example, it is assumed that the a-th cell string cSa is a selected cell string. In this case, the memory device 100 may apply a non-selection read voltage Vread to the string selection lines SSLa, SSLb, and SSLc, may apply the non-selection read voltage Vread to unselected word lines WL_unsel, may apply the non-selection read voltage Vread to the ground selection lines GSLua, GSLub, GSLda, and GSLdb, and may apply a first read voltage Vrd1 to a selected word line WL_sel. The non-selected read voltages refer to voltages sufficient to turn on the corresponding transistors regardless of their data state, whereas the first read voltage may turn on the corresponding transistor or may not turn on the corresponding transistor depending on the data state of the corresponding transistor.

After a given time passes, the memory device 100 may decrease the non-selection read voltage Vread ofunselected string selection lines (e.g., SSLb and SSLc) of the string selection lines SSLa, SSLb, and SSLc to a ground voltage and may decrease the non-selection read voltage Vread of unselected ground selection lines GSLub and GSLdb of the ground selection lines GSLua, GSLub, GSLda, and GSLdb to the ground voltage. In an embodiment, the unselected string selection lines may indicate string selection lines (i.e., SSLb and SSLc) that are not connected to the a-th cell string cSa being the selected cell string. In an embodiment, the unselected ground selection lines may indicate ground selection lines (i.e., GSLub and GSLdb) that are not connected to the a-th cell string cSa being the selected cell string.

Afterwards, the memory device 100 may perform a sensing operation with the first read voltage Vrd1 applied to the selected word line WL_sel, and may then perform the sensing operation while sequentially changing the first read voltage Vrd1 to a second read voltage Vrd2 and a third read voltage Vrd3.

As described above, the memory device 100 according to an embodiment of the present disclosure may include a memory block connected to ground selection lines of the asymmetric structure. In this case, the memory device 100 may independently connect each of cell strings to the common source line CSL by applying a non-selection read voltage (i.e., an on-voltage) to ground selection lines connected to a selected cell string and applying a ground voltage (i.e., an off-voltage) to the remaining ground selection lines. As can be seen, each different ground selection line (GSLua, GSLub, GSLda, and GSLdb) can be independently controlled so that different combinations of on or off voltage can be applied to the four ground selection lines in order to select from among the three cell strings.

Figure 15:
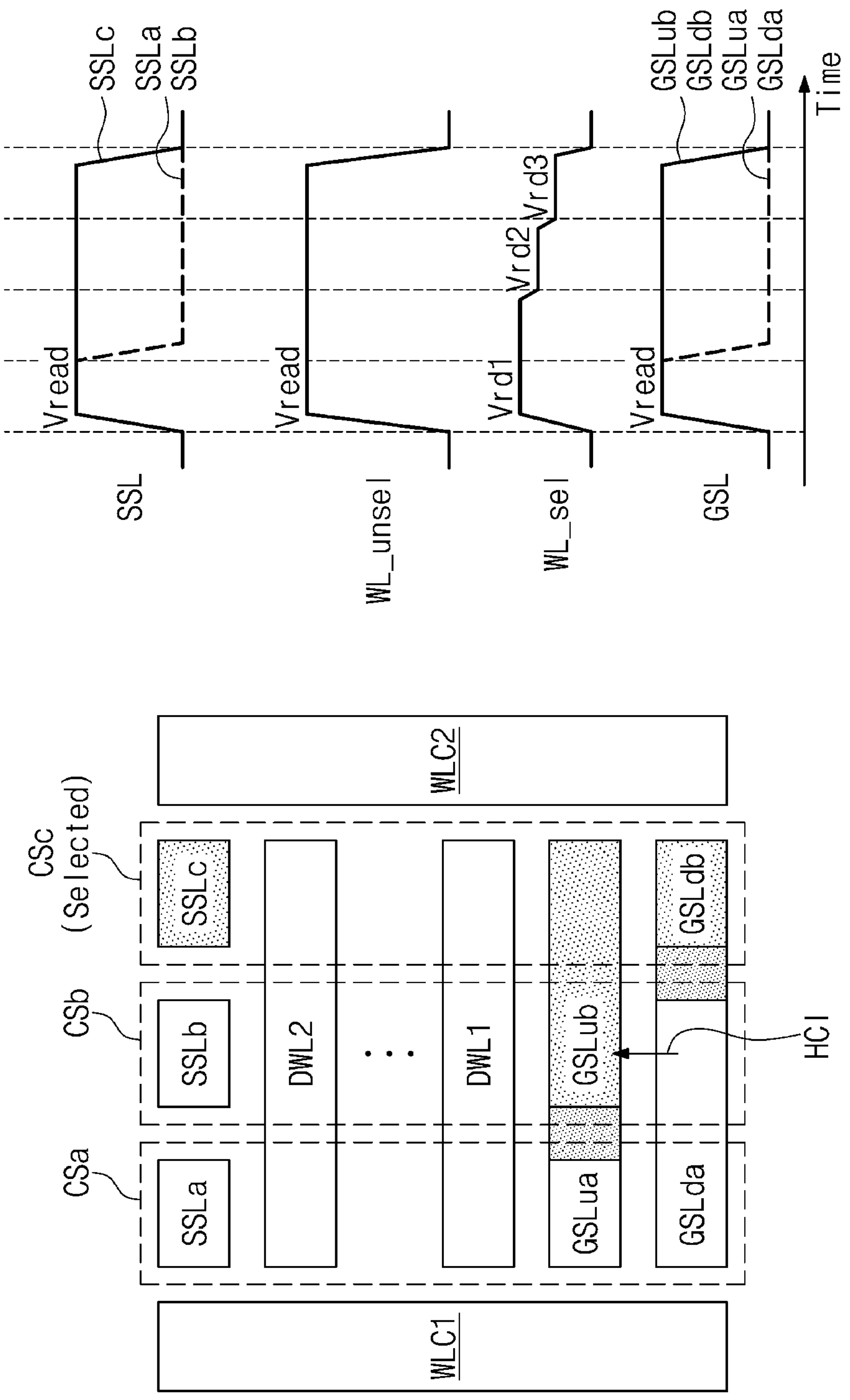
FIGS. 15 and 16 are diagrams for describing operations of a memory device illustrated in FIG. 1.
Figure 16:
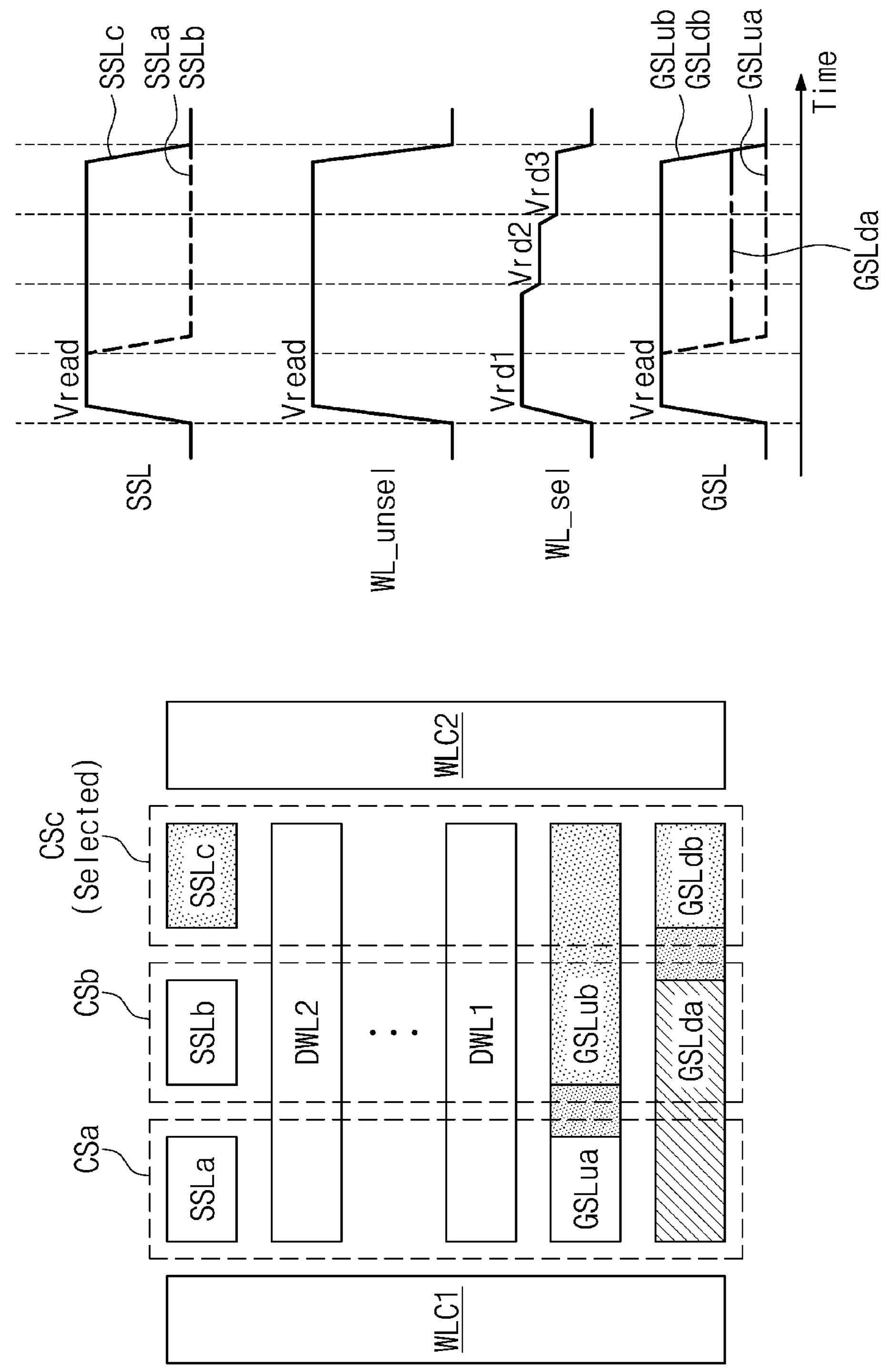

FIGS. 15 and 16 are diagrams for describing operations of a memory device illustrated in FIG. 1. For brevity of drawing and convenience of description, an operation of the memory device 100 will be described based on the first memory block BLK1, and thus, additional description associated with the components described above will be omitted to avoid redundancy. In an embodiment, the structure of the first memory block BLK1 is described above, and thus, additional description will be omitted to avoid redundancy.

Referring to FIGS. 1, 4, 15, and 16, in the read operation associated with the first memory block BLK1, the c-th cell string CSc may be a selected cell string. In this case, the memory device 100 may perform an operation similar to that described with reference to FIG. 14 except that a selected string selection line and a selected ground selection line are changed.

In an embodiment, as illustrated in FIG. 15, in the case where the c-th cell string CSc is a selected cell string, the non-selection read voltage Vread may be applied to the b-th upper ground selection line GSLub and the b-th lower ground selection line GSLdb, and a ground voltage may be applied to the a-th upper ground selection line GSLua and the a-th lower ground selection line GSLda. In this case, in the b-th cell string CSb connected with the b-th upper ground selection line GSLub and the a-th lower ground selection line GSLda, hot electron injection (HCI) may be generated due to a channel potential difference, thereby causing the reduction of reliability of the memory device 100.

In this case, as illustrated in FIG. 16, the hot electron injection (HCI) may be prevented by controlling voltages of some ground selection lines. For example, in the case where the c-th cell string CSc is a selected cell string, the non-selection read voltage Vread may be applied to the b-th upper ground selection line GSLub and the b-th lower ground selection line GSLdb. According to the above bias condition, as described with reference to FIG. 15, the hot electron injection (HCI) may be generated due to a potential difference of ground selection lines (i.e., GSLub and GSLda) connected to the b-th cell string CSb. In this case, the hot electron injection (HCI) may be prevented by decreasing voltages of ground selection lines (e.g., GSLub and GSLda) connected with the b-th cell string CSb. In detail, as illustrated in FIG. 16, because the b-th upper ground selection line GSLub is connected to the c-th cell string CSc, the non-selection read voltage Vread may be applied to the b-th upper ground selection line GSLub. Because the a-th lower ground selection line GSLda is not connected to the c-th cell string CSc, a ground voltage may be applied to the a-th lower ground selection line GSLda. However, because the a-th lower ground selection line GSLda is connected to the b-th cell string CSb together with the b-th upper ground selection line GSLub to which the non-selection read voltage Vread is applied, a first voltage V1 may be applied to the a-th lower ground selection line GSLda for the purpose of reducing a potential difference of ground selection lines belonging to the same unselected cell string. The first voltage V1 may be greater than the ground voltage and may be smaller than the non-selection read voltage Vread. In an embodiment, ground selection transistors connected to a ground selection line to which the first voltage V1 is applied may be turned off by the first voltage V1. As described above, in the case where voltages of some ground selection lines are controlled, the hot electron injection described with reference to FIG. 15 may be prevented. Accordingly, the reliability of the memory device may be improved.

FIG. 17 is a diagram for describing operations of a memory device of FIG. 1. In an embodiment, a bias condition of ground selection lines of the second memory block BLK2 in FIG. 9 will be described with reference to FIG. 17.

Referring to FIGS. 9 and 17, the second memory block BLK2 may include the 4 cell strings cSa, CSb, CSc, and CSd formed between the first word line cut WLC1 and the second word line cut WLC2. As described with reference to FIG. 9, one of the upper ground selection lines GSLu is connected to the a-th cell string cSa, and the other thereof is connected with the b-th, c-th, and d-th cell strings CSb, CSc, and CSd. One of the middle ground selection lines GSLm is connected with the a-th and b-th cell strings cSa and CSb, and the other thereof is connected with the c-th and d-th cell strings CSc and CSd. One of the lower ground selection lines GSLd is connected with the a-th, b-th, and c-th cell strings cSa, CSb, and CSc, and the other thereof is connected with the d-th cell string CSd.

In the above structure, in the case where the a-th cell string cSa is a selected cell string, the non-selection read voltage Vread is applied to ground selection lines (i.e., GSLua, GSLma, and GSLda) connected with the a-th cell string cSa, and the first voltage V1 is applied to the remaining ground selection lines (i.e., GSLub, GSLmb, and GSLdb). In an embodiment, the first voltage V1 may be a voltage sufficient to turn on ground selection transistors of cell strings. In this case, as ground selection transistors of the cell strings CSb, CSc, and CSd connected to the remaining ground selection lines GSLub, GSLmb, and GSLdb) are turned off, the remaining cell strings CSb, CSc, and CSd except for the a-th cell string cSa may not be connected to the common source line CSL.

As another example, in the case where the b-th cell string CSb is a selected cell string, the non-selection read voltage Vread is applied to ground selection lines (i.e., GSLub, GSLma, and GSLda) connected tO the b-th cell string CSb, and the first voltage V1 is applied to the remaining ground selection lines (i.e., GSLua, GSLmb, and GSLdb). In this case, the b-th upper ground selection line GSLub connected to the c-th and d-th cell strings CSc and CSd may have a level of the non-selection read voltage Vread, and the b-th middle ground selection line GSLmb may have a level of the first voltage V1. According to the above bias condition, as described above, the hot electron injection (HCI) may be generated in the c-th and d-th cell strings CSc and CSd. To prevent the HCI, instead of the first voltage V1, a second voltage V2 may be applied to the b-th middle ground selection line GSLmb. In an embodiment, the second voltage V2 may be higher in level than the first voltage V1 and may be lower in level than the non-selection read voltage Vread. Ground selection transistors may be turned off by the second voltage V2.

As another example, in the case where the c-th cell string CSc is a selected cell string, the non-selection read voltage Vread is applied to ground selection lines (i.e., GSLub, GSLmb, and GSLda) connected to the c-th cell string CSc, and the first voltage V1 is applied to the remaining ground selection lines (i.e., GSLua, GSLma, and GSLdb). In this case, the b-th upper ground selection line GSLub connected with the b-th cell string CSb may have a level of the non-selection read voltage Vread, and the a-th middle ground selection line GSLma may have a level of the first voltage V1. Also, the b-th middle ground selection line GSLmb connected to the d-th cell string CSd may have a level of the non-selection read voltage Vread, and the b-th lower ground selection line GSLdb may have a level of the first voltage V1. According to the above bias condition, as described above, the hot electron injection (HCI) may be generated in the b-th and d-th cell strings CSb and CSd. To prevent the HCI, instead of the first voltage V1, the second voltage V2 may be applied to the a-th middle ground selection line GSLma and the b-th lower ground selection line GSLdb.

As another example, in the case where the d-th cell string CSd is a selected cell string, the non-selection read voltage Vread is applied to ground selection lines (i.e., GSLub, GSLmb, and GSLdb) connected to the d-th cell string CSd, and the first voltage V1 is applied to the remaining ground selection lines (i.e., GSLua, GSLma, and GSLda). In this case, the b-th upper ground selection line GSLub connected with the b-th cell string CSb may have a level of the non-selection read voltage Vread, and the a-th middle ground selection line GSLma may have a level of the first voltage V1. Also, the b-th middle ground selection line GSLmb connected to the c-th cell string CSc may have a level of the non-selection read voltage Vread, and the a-th lower ground selection line GSLda may have a level of the first voltage V1. According to the above bias condition, as described above, the hot electron injection (HCI) may be generated in the b-th and c-th cell strings CSb and CSc. To prevent the HCI, instead of the first voltage V1, the second voltage V2 may be applied to the a-th middle ground selection line GSLma and the a-th lower ground selection line GSLda.

As described above, in an unselected cell string, in the case where a voltage of an upper ground selection line is a relatively great non-selection read voltage, the hot electron injection in the unselected cell string may be prevented by increasing voltages of lower ground selection lines placed under the upper ground selection line as much as a given voltage level.

The above bias conditions associated with ground selection lines are only an example, and the present disclosure is not limited thereto. A bias condition may be variously changed or modified depending on various asymmetric structures of ground selection lines.

Figure 18:
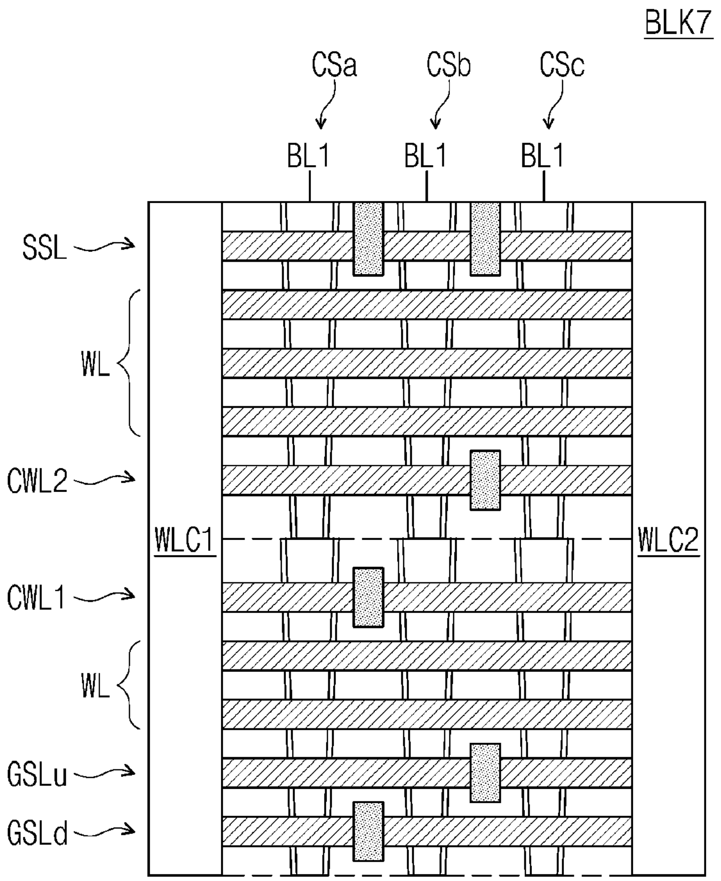
FIG. 18 is a diagram for describing a memory block included in a memory cell array of FIG. 1.

FIG. 18 is a diagram for describing a memory block included in a memory cell array of FIG. 1. Below, to describe embodiments of the present disclosure easily, some of lines of a memory block or a partial structure of the memory block is conceptually illustrated.

Referring to FIGS. 1 and 18, a seventh memory block BLK7 may include a first structure STR1 and a second structure STR2. The plurality of cell strings cSa, CSb, and CSc may be formed between the first word line cut WLC1 and the second word line cut WLC2 and may be respectively connected with the first bit lines BL1. The first structure STR1 may include some of cell strings of the plurality of cell strings cSa to CSc, and the second structure STR2 may include the remaining cell transistors.

The first structure STR1 may be formed on the substrate, and the second structure STR2 may be formed over the first structure STR1. For example, as illustrated in FIG. 18, the first structure STR1 may be formed on an N-well substrate. In an embodiment, a peripheral circuit (e.g., the address decoder 120, the page buffer circuit 130, the input/output circuit 140, and the control logic and voltage generating circuit 150 of FIG. 1) may be formed under the N-well substrate. For example, the memory device 100 may have a CoP (Cell-on-Peripheral) structure or a CUA (CMOS under Array) structure. In this case, the substrate that is connected with (or is in contact with) strings may be N-type. However, the present disclosure is not limited thereto. For example, the substrate that is connected with strings may be P-type.

The second structure STR2 may be formed over the first structure STR1. In this case, as illustrated in FIG. 18, a channel diameter may change in a region where the first structure STR1 and the second structure STR2 are electrically connected. For example, a channel of the first structure STR1 may be formed to penetrate lines GSLd, GSLu, WL, and CWL1 vertically stacked on the substrate, and a channel of the second structure STR2 may be formed to penetrate lines CWL2, WL, and SSL stacked on the first structure STR1. The channel of the first structure STR1 and the channel of the second structure STR2 may be electrically connected in a connecting region. As illustrated in FIG. 18, in the region where the first structure STR1 and the second structure STR2 are electrically connected, the channel diameter of the second structure STR2 may be smaller than the channel diameter of the first structure STR1.

As the channel diameter changes, for the reliability of operation, cell transistors adjacent to the connecting region of the first and second structures STR1 and STR2 may not be used to store actual user data. For example, word lines (e.g., connection word lines CWL1 and CWL2) adjacent to the connecting region of the first and second structures STR1 and STR2 may be used as dummy word lines.

In an embodiment, as illustrated in FIG. 18, ground selection lines (i.e., GSLu and GSLd) of the first structure STR1 may be formed between the first and second word line cuts WLC1 and WLC2 in the asymmetric structure, as in the above description given with reference to FIGS. 1 to 17. In an embodiment, the first junction word line CWL1 of the first structure STR1 and the second junction word line CWL2 of the second structure STR2 may be formed in the asymmetric structure, as in the structure of the ground selection lines GSLu and GSLd. For example, a portion of the first junction word line CWL1 of the first structure STR1 may be connected with the a-th cell string cSa, and the remaining portion thereof may be connected with the b-th and c-th cell strings CSb and CSc. A portion of the second junction word line CWL2 of the second structure STR2 may be connected with the a-th and b-th cell strings cSa and CSb, and the remaining portion thereof may be connected with the c-th cell string CSc. In an embodiment, a separation structure for separating the portions of the first junction word line CWL1 and a separation structure for separating the portions of the second junction word line CWL2 may not overlap each other when viewed from above a plane parallel to the substrate.

As described above, a memory device according to an embodiment of the present disclosure may include a memory block in which ground selection lines are implemented in an asymmetric structure. Alternatively, at least some (e.g., a word line, a dummy word line, a connection word line, and a string selection line) of various lines connected with the memory block may have the asymmetric structure described with reference to FIGS. 1 to 18.

As described above, a memory block according to an embodiment of the present disclosure may include a plurality of cell strings. The plurality of cell strings may be disposed between word line cuts. The plurality of cell strings between the word line cuts may be connected with ground selection lines placed at different heights from the substrate. In this case, the ground selection lines may be formed in an asymmetric structure. The asymmetric structure of the ground selection lines is described above, and thus, additional description will be omitted to avoid redundancy. As the ground selection lines are implemented in the asymmetric structure, an independent operation for each cell string may be secured (e.g., the independent connection of a common source line with each cell string may be secured). Accordingly, the reliability of operation of the memory device may be improved, and the manufacturing costs and the power consumption of the memory device may be reduced.

Figure 19:
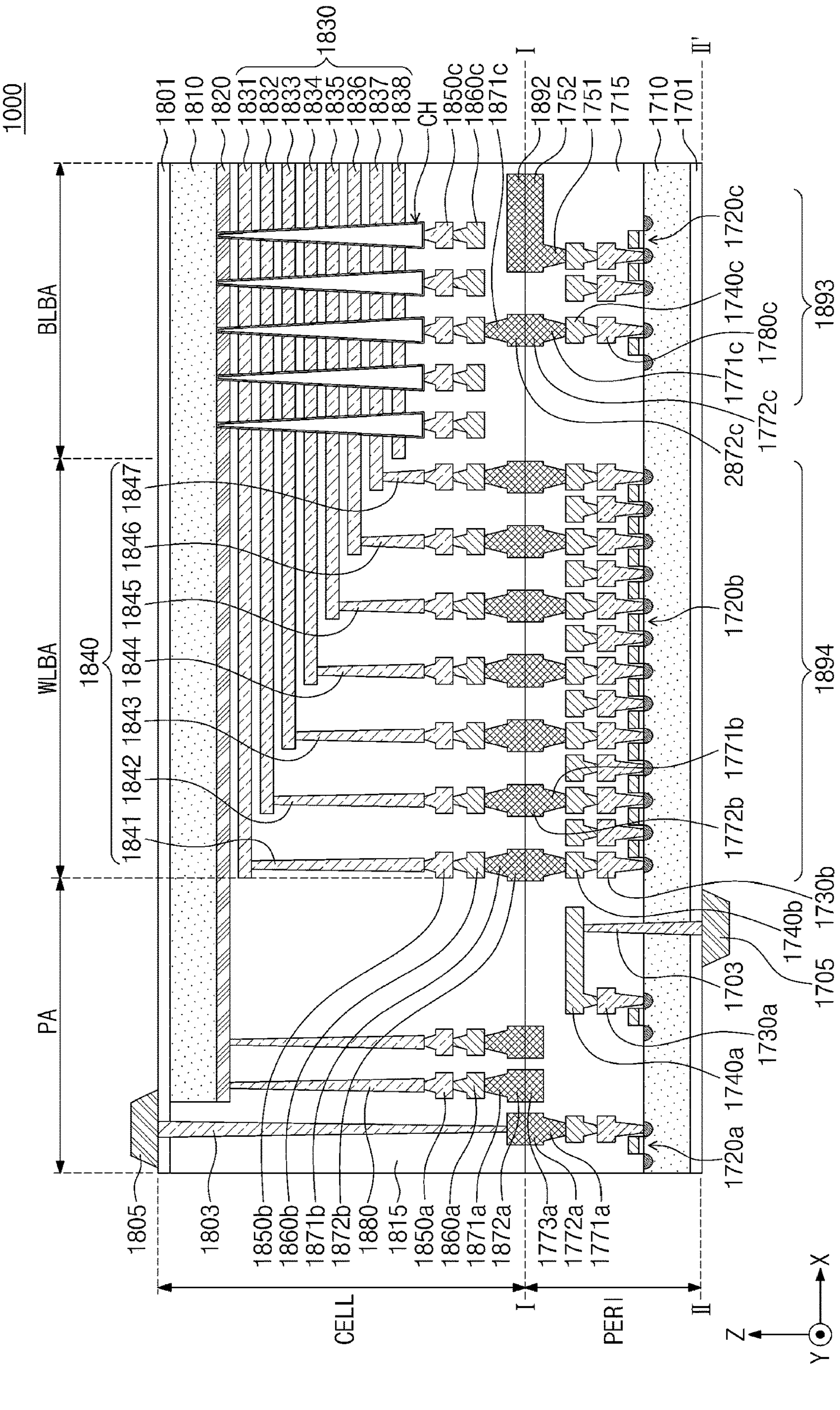
FIG. 19 is a cross-sectional view illustrating a memory device according to an embodiment of the present disclosure.

FIG. 19 is a diagram illustrating a memory device 1600 according to another example embodiment.

Referring to FIG. 19, a memory device 1600 may have a chip-to-chip (C2C) structure. The C2C structure refers to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, the bonding metals include or may be copper (Cu) using a Cu-to-Cu bonding. The example embodiment, however, is not limited thereto. For example, the bonding metals may also be formed of aluminum (Al) or tungsten (W).

Each of the peripheral circuit region PERI and the cell region CELL of the memory device 1600 may include an external pad bonding area PA, a word line bonding area WLBA, and a bit line bonding area BLBA.

The peripheral circuit region PERI may include a first substrate 1710, an interlayer insulating layer 1715, a plurality of circuit elements 1720*a*, 1720*b*, and 1720*c* formed on the first substrate 1710, first metal layers 1730*a*, 1730*b*, and 1730*c* respectively connected to the plurality of circuit elements 1720*a*, 1720*b*, and 1720*c*, and second metal layers 1740*a*, 1740*b*, and 1740*c* formed on the first metal layers 1730*a*, 1730*b*, and 1730*c*. In an example embodiment, the first metal layers 1730*a*, 1730*b*, and 1730*c* may be formed of tungsten having relatively high electrical resistivity, and the second metal layers 1740*a*, 1740*b*, and 1740*c* may be formed of copper having relatively low electrical resistivity.

In an example embodiment illustrate in FIG. 19, although only the first metal layers 1730*a*, 1730*b*, and 1730*c* and the second metal layers 1740*a*, 1740*b*, and 1740*c* are shown and described, the example embodiment is not limited thereto, and one or more additional metal layers may be further formed on the second metal layers 1740*a*, 1740*b*, and 1740*c*. At least a portion of the one or more additional metal layers formed on the second metal layers 1740*a*, 1740*b*, and 1740*c* may be formed of aluminum or the like having a lower electrical resistivity than those of copper forming the second metal layers 1740*a*, 1740*b*, and 1740*c*.

The interlayer insulating layer 1715 may be disposed on the first substrate 1710 and cover the plurality of circuit elements 1720*a*, 1720*b*, and 1720*c*, the first metal layers 1730*a*, 1730*b*, and 1730*c*, and the second metal layers 1740*a*, 1740*b*, and 1740*c*. The interlayer insulating layer 1715 may include an insulating material such as silicon oxide, silicon nitride, or the like.

Lower bonding metals 1771*b* and 1772*b* may be formed on the second metal layer 1740*b* in the word line bonding area WLBA. In the word line bonding area WLBA, the lower bonding metals 1771*b* and 1772*b* in the peripheral circuit region PERI may be electrically bonded to upper bonding metals 1871*b* and 1872*b* of the cell region CELL. The lower bonding metals 1771*b* and 1772*b* and the upper bonding metals 1871*b* and 1872*b* may be formed of aluminum, copper, tungsten, or the like. Further, the upper bonding metals 1871*b* and 1872*b* in the cell region CELL may be referred as first metal pads and the lower bonding metals 1771*b* and 1772*b* in the peripheral circuit region PERI may be referred as second metal pads.

The cell region CELL may include at least one memory block. The cell region CELL may include a second substrate 1810 and a common source line 1820. On the second substrate 1810, a plurality of word lines 1831 to 1838 (i.e., 1830) may be stacked in a direction (a Z-axis direction), perpendicular to an upper surface of the second substrate 1810. Though not shown, at least one string select line and at least one ground select line may be arranged on and below the plurality of word lines 1830, respectively, and the plurality of word lines 1830 may be disposed between the at least one string select line and the at least one ground select line. In this example, the at least one ground select line would be between the plurality of word lines 1831 to 1838 and the second substrate 1810, and the at least one string select line would be between the plurality of word lines 1831 to 1838 and the first substrate 1710. The at least one ground select line can be at least two levels of ground select lines, arranged in one of the configurations discussed previously in connection with FIGS. 1-18.

In the bit line bonding area BLBA, a channel structure CH may extend in a direction(a Z-axis direction), perpendicular to the upper surface of the second substrate 1810, and pass through the plurality of word lines 1830, the at least one string select line, and the at least one ground select line. The channel structure CH may include a data storage layer, a channel layer, a buried insulating layer, and the like, and the channel layer may be electrically connected to a first metal layer 1850*c* and a second metal layer 1860*c*. For example, the first metal layer 1850*c* may be a bit line contact, and the second metal layer 1860*c* may be a bit line. In an example embodiment, the bit line 1860*c* may extend in a first direction (a Y-axis direction), parallel to the upper surface of the second substrate 1810.

In an example embodiment illustrated in FIG. 19, an area in which the channel structure CH, the bit line 1860*c*, and the like are disposed may be defined as the bit line bonding area BLBA. In the bit line bonding area BLBA, the bit line 1860*c* may be electrically connected to the circuit elements 1720*c* providing a page buffer 1893 in the peripheral circuit region PERI. The bit line 1860*c* may be connected to upper bonding metals 1871*c* and 1872*c* in the cell region CELL, and the upper bonding metals 1871*c* and 1872*c* may be connected to lower bonding metals 1771*c* and 1772*c* connected to the circuit elements 1720*c* of the page buffer 1893. In an example embodiment, a program operation may be executed based on a page unit as write data of the page-unit is stored in the page buffer 1893, and a read operation may be executed based on a sub-page unit as read data of the sub-page unit is stored in the page buffer 1893. Also, in the program operation and the read operation, units of data transmitted through bit lines may be different from each other.

In the word line bonding area WLBA, the plurality of word lines 1830 may extend in a second direction (an X-axis direction), parallel to the upper surface of the second substrate 1810 and perpendicular to the first direction, and may be connected to a plurality of cell contact plugs 1841 to 1847 (i.e., 1840). The plurality of word lines 1830 and the plurality of cell contact plugs 1840 may be connected to each other in pads provided by at least a portion of the plurality of word lines 1830 extending in different lengths in the second direction. A first metal layer 1850*b* and a second metal layer 1860*b* may be connected to an upper portion of the plurality of cell contact plugs 1840 connected to the plurality of word lines 1830, sequentially. The plurality of cell contact plugs 1840 may be connected to the peripheral circuit region PERI by the upper bonding metals 1871*b* and 1872*b* of the cell region CELL and the lower bonding metals 1771*b* and 1772*b* of the peripheral circuit region PERI in the word line bonding area WLBA.

The plurality of cell contact plugs 1840 may be electrically connected to the circuit elements 1720*b* forming a row decoder 1894 in the peripheral circuit region PERI. In an example embodiment, operating voltages of the circuit elements 1720*b* of the row decoder 1894 may be different than operating voltages of the circuit elements 1720*c* forming the page buffer 1893. For example, operating voltages of the circuit elements 1720*c* forming the page buffer 1893 may be greater than operating voltages of the circuit elements **1720*b* forming the row decoder 1894**.

A common source line contact plug 1880 may be disposed in the external pad bonding area PA. The common source line contact plug 1880 may be formed of a conductive material such as a metal, a metal compound, polysilicon, or the like, and may be electrically connected to the common source line 1820. A first metal layer **1850*a* and a second metal layer 1860*a* may be stacked on an upper portion of the common source line contact plug 1880, sequentially. For example, an area in which the common source line contact plug 1880, the first metal layer 1850*a*, and the second metal layer 1860*a*** are disposed may be defined as the external pad bonding area PA.

Input-output pads 1705 and 1805 may be disposed in the external pad bonding area PA. Referring to FIG. 19, a lower insulating film 1701 covering a lower surface of the first substrate 1710 may be formed below the first substrate 1710, and a first input-output pad 1705 may be formed on the lower insulating film 1701. The first input-output pad 1705 may be connected to at least one of the plurality of circuit elements **1720*a*, 1720*b*, and 1720*c* disposed in the peripheral circuit region PERI through a first input-output contact plug 1703, and may be separated from the first substrate 1710 by the lower insulating film 1701. In addition, a side insulating film may be disposed between the first input-output contact plug 1703 and the first substrate 1710 to electrically separate the first input-output contact plug 1703 and the first substrate 1710**.

Referring to FIG. 19, an upper insulating film 1801 covering the upper surface of the second substrate 1810 may be formed on the second substrate 1810, and a second input-output pad 1805 may be disposed on the upper insulating layer 1801. The second input-output pad 1805 may be connected to at least one of the plurality of circuit elements **1720*a*, 1720*b*, and 1720*c* disposed in the peripheral circuit region PERI through a second input-output contact plug 1803. In the example embodiment, the second input-output pad 1805 is electrically connected to a circuit element 1720*a***.

According to embodiments, the second substrate 1810 and the common source line 1820 may not be disposed in an area in which the second input-output contact plug 1803 is disposed. Also, the second input-output pad 1805 may not overlap the word lines 1830 in the third direction (the Z-axis direction). Referring to FIG. 19, the second input-output contact plug 303 may be separated from the second substrate 1810 in a direction, parallel to the upper surface of the second substrate 1810, and may pass through the interlayer insulating layer 1815 of the cell region CELL to be connected to the second input-output pad 1805.

According to embodiments, the first input-output pad 1705 and the second input-output pad 1805 may be selectively formed. For example, the memory device 1600 may include only the first input-output pad 1705 disposed on the first substrate 1710 or the second input-output pad 1805 disposed on the second substrate 1810. Alternatively, the memory device 1600 may include both the first input-output pad 1705 and the second input-output pad 1805.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 1600 may include a lower metal pattern **1773*a*, corresponding to an upper metal pattern 1872*a* formed in an uppermost metal layer of the cell region CELL, and having the same cross-sectional shape as the upper metal pattern 1872*a* of the cell region CELL so as to be connected to each other, in an uppermost metal layer of the peripheral circuit region PERI. In the peripheral circuit region PERI, the lower metal pattern 1773*a* formed in the uppermost metal layer of the peripheral circuit region PERI may not be connected to a contact. Similarly, in the external pad bonding area PA, an upper metal pattern 1872*a*, corresponding to the lower metal pattern 1773*a* formed in an uppermost metal layer of the peripheral circuit region PERI, and having the same shape as a lower metal pattern 1773*a*** of the peripheral circuit region PERI, may be formed in an uppermost metal layer of the cell region CELL.

The lower bonding metals **1771*b* and 1772*b* may be formed on the second metal layer 1740*b* in the word line bonding area WLBA. In the word line bonding area WLBA, the lower bonding metals 1771*b* and 1772*b* of the peripheral circuit region PERI may be electrically connected to the upper bonding metals 1871*b* and 1872*b*** of the cell region CELL by a Cu-to-Cu bonding.

Further, in the bit line bonding area BLBA, an upper metal pattern 1892, corresponding to a lower metal pattern 1752 formed in the uppermost metal layer of the peripheral circuit region PERI, and having the same cross-sectional shape as the lower metal pattern 1752 of the peripheral circuit region PERI, may be formed in an uppermost metal layer of the cell region CELL. A contact may not be formed on the upper metal pattern 1892 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

In an embodiment, the memory device of FIG. 19 may include the memory device described with reference to FIGS. 1 to 18. In an embodiment, ground selection lines or various other word lines illustrated in FIG. 19 may be formed between word line cuts in an asymmetric structure as described with reference to FIGS. 1 to 18 and may be controlled as described with reference to FIGS. 1 to 18.

Figure 20:
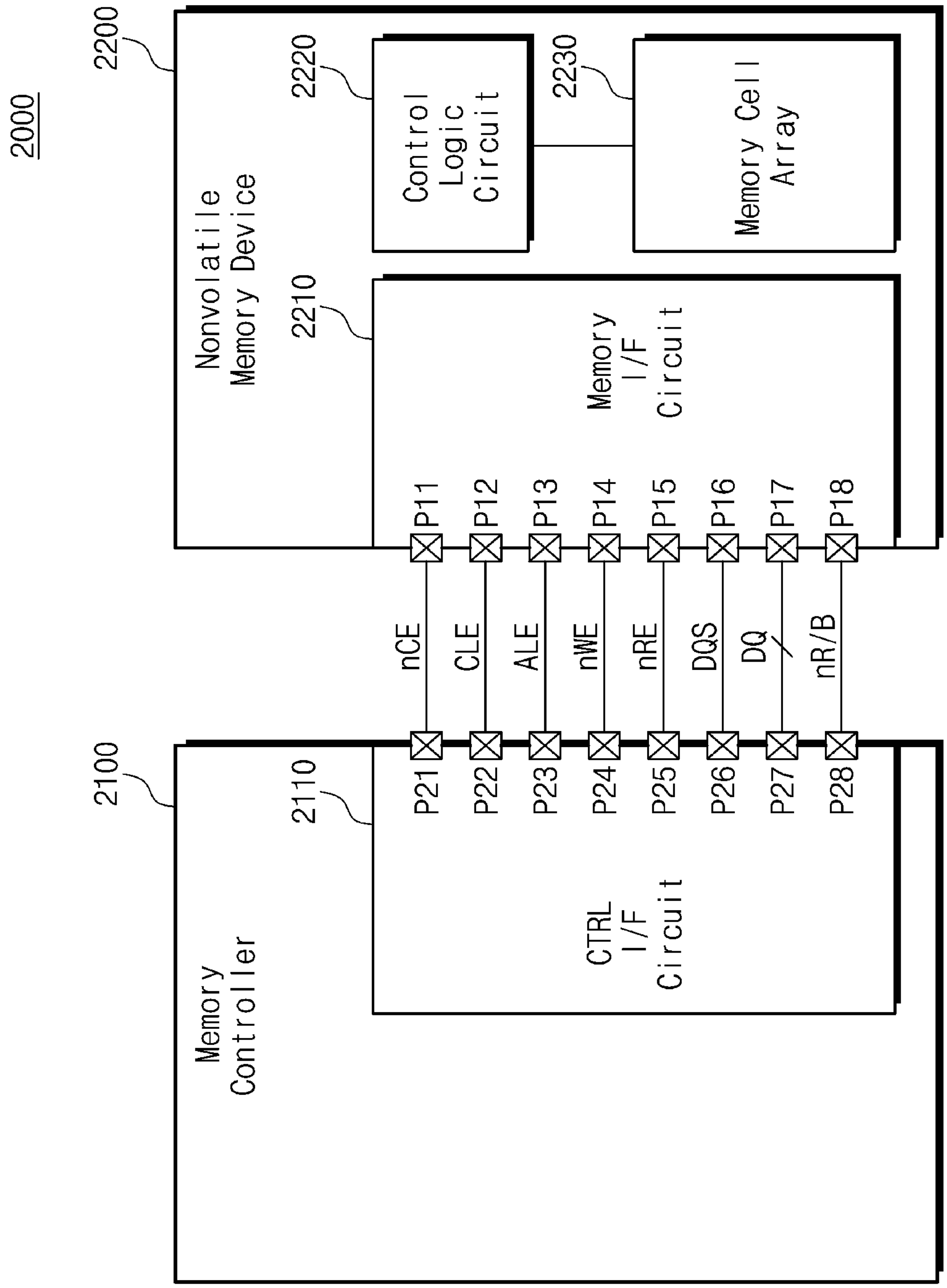
FIG. 20 is a block diagram illustrating a memory system according to an embodiment of the present disclosure.

FIG. 20 is a block diagram of a memory system 2000 according to an embodiment. Referring to FIG. 20, the memory system 2000 may include a memory device 2200 and a memory controller 2100. The memory device 2200 may include first to eighth pins P11 to P18, a memory interface circuitry 2210, a control logic circuitry 2220, and a memory cell array 2230.

The memory interface circuitry 2210 may receive a chip enable signal nCE from the memory controller 2100 through the first pin P11. The memory interface circuitry 2210 may transmit and receive signals to and from the memory controller 2100 through the second to eighth pins P12 to P18 in response to the chip enable signal nCE. For example, when the chip enable signal nCE is in an enable state (e.g., a low level), the memory interface circuitry 2210 may transmit and receive signals to and from the memory controller 2100 through the second to eighth pins P12 to P18.

The memory interface circuitry 2210 may receive a command latch enable signal CLE, an address latch enable signal ALE, and a write enable signalnewE from the memory controller 2100 through the second to fourth pins P12 to P14. The memory interface circuitry 2210 may receive a data signal DQ from the memory controller 2100 through the seventh pin P17 or transmit the data signal DQ to the memory controller 2100. A command CMD, an address ADDR, and data may be transmitted via the data signal DQ. For example, the data signal DQ may be transmitted through a plurality of data signal lines. In this case, the seventh pin P17 may include a plurality of pins respectively corresponding to a plurality of data signals DQ(s).

The memory interface circuitry 2210 may obtain the command CMD from the data signal DQ, which is received in an enable section (e.g., a high-level state) of the command latch enable signal CLE based on toggle time points of the write enable signew nWE. The memory interface circuitry 2210 may obtain the address ADDR from the data signal DQ, which is received in an enable section (e.g., a high-level state) of the address latch enable signal ALE based on the toggle time points of the write enable newnal nWE.

In an example embodiment, the write enabnewsignal nWE may be maintained at a static state (e.g., a high level or a low level) and toggle between the high level and the low level. For example, the write enewle signal nWE may toggle in a section in which the command CMD or the address ADDR is transmitted. Thus, the memory interface circuitry 2210 may obtain the command CMD or the address ADDR based on toggle time points of the writnewnable signal nWE.

The memory interface circuitry 2210 may receive a read enable signal nRE from the memory controller 2100 through the fifth pin P15. The memory interface circuitry 2210 may receive a data strobe signal DQS from the memory controller 2100 through the sixth pin P16 or transmit the data strobe signal DQS to the memory controller 2100.

In a data (DATA) output operation of the memory device 2200, the memory interface circuitry 2210 may receive the read enable signal nRE, which toggles through the fifth pin P15, before outputting the data DATA. The memory interface circuitry 2210 may generate the data strobe signal DQS, which toggles based on the toggling of the read enable signal nRE. For example, the memory interface circuitry 2210 may generate a data strobe signal DQS, which starts toggling after a predetermined delay (e.g., tDQSRE), based on a toggling start time of the read enable signal nRE. The memory interface circuitry 2210 may transmit the data signal DQ including the data DATA based on a toggle time point of the data strobe signal DQS. Thus, the data DATA may be aligned with the toggle time point of the data strobe signal DQS and transmitted to the memory controller 2100.

In a data (DATA) input operation of the memory device 2200, when the data signal DQ including the data DATA is received from the memory controller 2100, the memory interface circuitry 2210 may receive the data strobe signal DQS, which toggles, along with the data DATA from the memory controller 2100. The memory interface circuitry 2210 may obtain the data DATA from the data signal DQ based on toggle time points of the data strobe signal DQS. For example, the memory interface circuitry 2210 may sample the data signal DQ at rising and falling edges of the data strobe signal DQS and obtain the data DATA.

The memory interface circuitry 2210 may transmit a ready/busy output signal nR/B to the memory controller 2100 through the eighth pin P18. The memory interface circuitry 2210 may transmit state information of the memory device 2200 through the ready/busy output signal nR/B to the memory controller 2100. When the memory device 2200 is in a busy state (i.e., when operations are being performed in the memory device 2200), the memory interface circuitry 2210 may transmit a ready/busy output signal nR/B indicating the busy state to the memory controller 2100. When the memory device 2200 is in a ready state (i.e., when operations are not performed or completed in the memory device 2200), the memory interface circuitry 2210 may transmit a ready/busy output signal nR/B indicating the ready state to the memory controller 2100. For example, while the memory device 2200 is reading data DATA from the memory cell array 2230 in response to a page read command, the memory interface circuitry 2210 may transmit a ready/busy output signal nR/B indicating a busy state (e.g., a low level) to the memory controller 2100. For example, while the memory device 2200 is programming data DATA to the memory cell array 2230 in response to a program command, the memory interface circuitry 2210 may transmit a ready/busy output signal nR/B indicating the busy state to the memory controller 2100.

The control logic circuitry 2220 may control all operations of the memory device 2200. The control logic circuitry 2220 may receive the command/address CMD/ADDR obtained from the memory interface circuitry 2210. The control logic circuitry 2220 may generate control signals for controlling other components of the memory device 2200 in response to the received command/address CMD/ADDR. For example, the control logic circuitry 2220 may generate various control signals for programming data DATA to the memory cell array 2230 or reading the data DATA from the memory cell array 2230.

The memory cell array 2230 may store the data DATA obtained from the memory interface circuitry 2210, via the control of the control logic circuitry 2220. The memory cell array 2230 may output the stored data DATA to the memory interface circuitry 2210 via the control of the control logic circuitry 2220.

The memory cell array 2230 may include a plurality of memory cells. For example, the plurality of memory cells may be flash memory cells. However, the inventive concept is not limited thereto, and the memory cells may be RRAM cells, FRAM cells, PRAM cells, thyristor RAM (TRAM) cells, or MRAM cells. Hereinafter, an embodiment in which the memory cells are NAND flash memory cells will mainly be described.

The memory controller 2100 may include first to eighth pins P21 to P28 and a controller interface circuitry 2210. The first to eighth pins P21 to P28 may respectively correspond to the first to eighth pins P11 to P18 of the memory device 2200.

The controller interface circuitry 2210 may transmit a chip enable signal nCE to the memory device 2200 through the first pin P21. The controller interface circuitry 2210 may transmit and receive signals to and from the memory device 2200, which is selected by the chip enable signal nCE, through the second to eighth pins P22 to P28.

The controller interface circuitry 2210 may transmit the command latch enable signal CLE, the address latch enable signal ALE, and the wnewe enable signal nWE to the memory device 2200 through the second to fourth pins P22 to P24. The controller interface circuitry 2210 may transmit or receive the data signal DQ to and from the memory device 2200 through the seventh pin P27.

The controller interface circuitry 2110 may transmit the data signal DQ including the command CMD or the address ADDR to the memory device 2200 along with thnewrite enable signal nWE, which toggles. The controller interface circuitry 2110 may transmit the data signal DQ including the command CMD to the memory device 2200 by transmitting a command latch enable signal CLE having an enable state. Also, the controller interface circuitry 2110 may transmit the data signal DQ including the address ADDR to the memory device 2200 by transmitting an address latch enable signal ALE having an enable state.

The controller interface circuitry 2110 may transmit the read enable signal nRE to the memory device 2200 through the fifth pin P25. The controller interface circuitry 2110 may receive or transmit the data strobe signal DQS from or to the memory device 2200 through the sixth pin P26.

In a data (DATA) output operation of the memory device 2200, the controller interface circuitry 2110 may generate a read enable signal nRE, which toggles, and transmit the read enable signal nRE to the memory device 2200. For example, before outputting data DATA, the controller interface circuitry 2110 may generate a read enable signal nRE, which is changed from a static state (e.g., a high level or a low level) to a toggling state. Thus, the memory device 2200 may generate a data strobe signal DQS, which toggles, based on the read enable signal nRE. The controller interface circuitry 2110 may receive the data signal DQ including the data DATA along with the data strobe signal DQS, which toggles, from the memory device 2200. The controller interface circuitry 2110 may obtain the data DATA from the d58ogsignal DQ based on a toggle time point of the data strobe signal DQS.

In a data (DATA) input operation of the memory device 2200, the controller interface circuitry 2110 may generate a data strobe signal DQS, which toggles. For example, before transmitting data DATA, the controller interface circuitry 2110 may generate a data strobe signal DQS, which is changed from a static state (e.g., a high level or a low level) to a toggling state. The controller interface circuitry 2110 may transmit the data signal DQ including the data DATA to the memory device 2200 based on toggle time points of the data strobe signal DQS.

The controller interface circuitry 2110 may receive a ready/busy output signal nR/B from the memory device 2200 through the eighth pin P28. The controller interface circuitry 2110 may determine state information of the memory device 2200 based on the ready/busy output signal nR/B.

In an embodiment, the memory device 2200 may include the memory device described with reference to FIGS. 1 to 19 or may operate based on the operation method described with reference to FIGS. 1 to 19.

According to the present disclosure, a memory device includes a memory block having ground selection lines of an asymmetric structure. As such, the ground selection lines may be normally formed, and an independent operation for each cell string may be secured. This may mean that the reduction of reliability and performance of the memory device and the increase in power consumption of the memory device are prevented.

While the present disclosure has been described with reference to embodiments thereof, it will be apparent to those of ordinary skill in the art that various changes and modifications may be made thereto without departing from the spirit and scope of the present disclosure as set forth in the following claim

What is claimed is:

1. A memory device comprising:
- a substrate;
- a first cell string, a second cell string, and a third cell string, each connected to a first bit line and formed in a first direction perpendicular to a top surface of the substrate;
- a first upper ground selection line connected to the first cell string;
- a second upper ground selection line separated from the first upper ground selection line, and connected to the second and third cell strings;
- a first lower ground selection line connected to the first and second cell strings; and
- a second lower ground selection line separated from the first lower ground selection line, and connected to the third cell string,
- wherein the first and second upper ground selection lines are disposed at a first distance in the first direction from the top surface of the substrate and the first and second lower ground selection lines are disposed at a second distance in the first direction from the top surface of the substrate, the second distance different from the first distance.

2. The memory device of claim 1, further comprising:
- a plurality of word lines connected in common to the first, second, and third cell strings and stacked on the first and second upper ground selection lines in the first direction.

3. The memory device of claim 1, further comprising:
- a first ground selection line separation structure formed between the first and second upper ground selection lines; and
- a second ground selection line separation structure formed between the first and second lower ground selection lines,
- wherein the first ground selection line separation structure and the second ground selection line separation structure do not overlap each other when viewed in a plan view from above a first plane parallel to the top surface of the substrate.

4. The memory device of claim 3, further comprising:
- a first dummy hole formed between the first and second cell strings to extend in the direction perpendicular to the top surface of the substrate; and
- a second dummy hole formed between the second and third cell strings to extend in the direction perpendicular to the top surface of the substrate,
- wherein the first ground selection line separation structure and the first dummy hole overlap each other when viewed in the plan view, and
- wherein the second ground selection line separation structure and the second dummy hole overlap each other when viewed in the plan view.

5. The memory device of claim 3, further comprising:
- a fourth to a sixth cell string connected to the first bit line and formed in the direction perpendicular to the top surface of the substrate;
- a third upper ground selection line connected to the fourth and fifth cell strings;
- a fourth upper ground selection line connected to the sixth cell string and separated from the third upper ground selection line;
- a third lower ground selection line connected to the fourth cell string;
- a fourth lower ground selection line connected to the fifth and sixth cell strings and separated from the third lower ground selection line;
- a first word line cut region formed in the direction perpendicular to the top surface of the substrate;
- a second word line cut region spaced apart from the first word line cut region in a first direction; and
- a third word line cut region spaced from the second word line cut region in the first direction,
- wherein the first to third cell strings are formed between the first and second word line cut regions, and wherein the fourth to sixth cell strings are formed between the second and third word line cut regions.

6. The memory device of claim 5, further comprising:

a third ground selection line separation structure formed between the third and fourth upper ground selection lines; and a fourth ground selection line separation structure formed between the third and fourth lower ground selection lines, wherein a first distance between the second word line cut region and the first ground selection line separation structure is equal to a second distance between the second word line cut region and the third ground selection line separation structure, and wherein a third distance between the second word line cut region and the second ground selection line separation structure is equal to a fourth distance between the second word line cut region and the fourth ground selection line separation structure.

7. The memory device of claim 1, further comprising:

a first string selection line connected to the first cell string;

a second string selection line connected to the second cell string; and a third string selection line connected to the third cell string.

8. The memory device of claim 7, further comprising:

a fourth cell string connected to a second bit line, connected to the first string selection line, and formed in the first direction;

a fifth cell string connected to the second bit line, connected to the second string selection line, and formed in the first direction; and a sixth cell string connected to the second bit line, connected to the third string selection line, and formed in the first direction.

9. The memory device of claim 8, wherein the first upper ground selection line is connected to the fourth cell string and is separated from the second upper ground selection line, wherein the second upper ground selection line is connected to the fifth and sixth cell strings, wherein the first lower ground selection line is connected to the fourth and fifth cell strings and is separated from the second lower ground selection line, and wherein the second lower ground selection line is connected to the sixth cell string.

10. The memory device of claim 1, further comprising:

an erase control line formed between the first and second lower ground selection lines and the substrate and connected to the first to third cell strings.

11. The memory device of claim 1, wherein the memory device is configured to, when the third cell string is a selected cell string in a read operation of the memory device:

apply a first voltage to the first upper ground selection line;

apply a non-selection read voltage to the second upper ground selection line;

apply a second voltage to the first lower ground selection line, the second voltage being greater than the first voltage and smaller than the non-selection read voltage; and apply the non-selection read voltage to the second lower ground selection line.

12. A memory device comprising:

a substrate;

a first cell string including a plurality of first cells connected to a first bit line and formed in a first direction perpendicular to a top surface of the substrate;

a second cell string including a plurality of second cells connected to the first bit line and formed in the first direction;

a third cell string including a plurality of third cells connected to the first bit line and formed in the first direction;

a first lower ground selection line and a second lower ground selection line placed at a first height above a top surface of the substrate, the first lower ground selection line connecting to the first cell string and the second cell string, and the second lower ground selection line connecting to the third cell string;

a first ground selection line separation structure formed at the first height between the first and second lower ground selection lines;

a first upper ground selection line and a second upper ground selection line placed at a second height above the top surface of the substrate and stacked on the first and second lower ground selection lines in a direction perpendicular to the substrate, the first upper ground selection line connecting to the first cell string, and the second upper ground selection line connecting to the second cell string and the third cell string; and a second ground selection line separation structure formed at the second height between the first and second upper ground selection lines, wherein the first ground selection line separation structure and the second ground selection line separation structure do not overlap each other when viewed in a plan view from above a first plane parallel to the substrate.

13. The memory device of claim 12, further comprising:

a plurality of word lines stacked on the first and second upper ground selection lines in the direction perpendicular to the top surface of the substrate; and a first string selection line, a second string selection line, and a third string selection line stacked on the plurality of word lines so as to be placed at a third height above the top surface of the substrate.

14. The memory device of claim 13, further comprising:

a plurality of first cell strings formed to penetrate the first string selection line, the plurality of word lines, the first upper ground selection line, and the first lower ground selection line in the direction perpendicular to the top surface of the substrate;

a plurality of second cell strings formed to penetrate the second string selection line, the plurality of word lines, the second upper ground selection line, and the first lower ground selection line in the direction perpendicular to the top surface of the substrate; and a plurality of third cell strings formed to penetrate the third string selection line, the plurality of word lines, the second upper ground selection line, and the second lower ground selection line in the direction perpendicular to the top surface of the substrate.

15. The memory device of claim 14, further comprising:

a first word line cut region formed in the direction perpendicular to the top surface of the substrate; and a second word line cut region formed in the direction perpendicular to the top surface of the substrate and spaced from the first word line cut region in a first direction, wherein the plurality of first cell strings, the plurality of second cell strings, and the plurality of third cell strings are formed between the first and second word line cuts regions.

16. A memory device comprising:
a substrate;
a first word line cut region formed in a direction perpendicular to a top surface of the substrate;
a second word line cut region spaced from the first word line cut region in a first direction;
a plurality of cell strings arranged between the first and second word line cut regions in the first direction and extending in the direction perpendicular to the top surface of the substrate; and
a plurality of ground selection lines connected to the plurality of cell strings,
wherein a first ground selection line of the plurality of ground selection lines is connected to a first string of the plurality of cell strings,
wherein a second ground selection line of the plurality of ground selection lines and separate from the first ground selection line is connected to a second string and a third string of the plurality of cell strings, wherein the second ground selection line is not connected to the first string, and the first ground selection line is not connected to either of the second string or the third string,
wherein a third ground selection line of the plurality of ground selection lines is connected to the first string and the second string of the plurality of cell strings and is not connected to the first string, and
wherein a fourth ground selection line of the plurality of ground selection lines and separate from the third ground selection line is connected to the third string of the plurality of cell strings and is not connected to either of the first string or the second string.

17. The memory device of claim 16, further comprising:
a plurality of word lines formed between the first and second word line cut regions and connected to the plurality of cell strings;
a first string selection line formed between the first and second word line cut regions and connected to the first string of the plurality of cell strings;
a second string selection line formed between the first and second word line cut regions and connected to the second string of the plurality of cell strings; and
a third string selection line formed between the first and second word line cut regions and connected to the third string of the plurality of cell strings.

18. The memory device of claim 16, further comprising:
a first ground selection line separation structure formed between the first and second ground selection lines; and
a second ground selection line separation structure formed between the third and fourth ground selection lines,
wherein, when viewed in a plan view from above a first plane parallel to the substrate, the first ground selection line separation structure overlaps dummy holes between the first string and the second string of the plurality of cell strings, and
wherein, when viewed in a plan view from above the first plane parallel to the substrate, the second ground selection line separation structure overlaps dummy holes between the second string and the third string of the plurality of cell strings.

19. The memory device of claim 16, wherein a fifth ground selection line of the plurality of ground selection lines is connected to the first string, the second string, and the third string of the plurality of cell strings,
wherein a sixth ground selection line of the plurality of ground selection lines is connected to a fourth string of the plurality of cell strings,
wherein the second ground selection line of the plurality of ground selection lines is further connected to the fourth string of the plurality of cell strings, and
wherein the fourth ground selection line of the plurality of ground selection lines is further connected to the fourth string of the plurality of cell strings.

* * * * *